United States Patent
Gunnarsson et al.

(10) Patent No.: US 6,449,462 B1
(45) Date of Patent: *Sep. 10, 2002

(54) METHOD AND SYSTEM FOR QUALITY-BASED POWER CONTROL IN CELLULAR COMMUNICATIONS SYSTEMS

(75) Inventors: Fredrik Gunnarsson; Jonas Blom, both of Linköping; Fredrik Gustafsson, Ljungsbro, all of (SE)

(73) Assignee: Telefonaktiebolaget L M Ericsson (PUBL), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,635

(22) Filed: Feb. 27, 1998

(51) Int. Cl.[7] .................................................. H04B 17/00
(52) U.S. Cl. ............................ 455/67.3; 455/63; 455/69
(58) Field of Search ............................... 455/67.1, 33.1, 455/126, 67, 522, 63, 67.3, 69; 341/139; 370/335; 375/200; 364/161

(56) References Cited

U.S. PATENT DOCUMENTS

| | | | | |
|---|---|---|---|---|
| 4,910,794 A | * | 3/1990 | Mahany ........................ 455/67 |
| 5,216,692 A | * | 6/1993 | Ling ............................ 375/1 |
| 5,270,916 A | * | 12/1993 | Sexton et al. ................ 364/161 |
| 5,386,589 A | * | 1/1995 | Kanai ........................ 455/33.1 |
| 5,412,686 A | * | 5/1995 | Ling ............................ 375/200 |
| 5,448,751 A | * | 9/1995 | Takenaka et al. ............. 455/33.1 |
| 5,551,057 A | * | 8/1996 | Mitra ......................... 455/33.1 |
| 5,574,982 A | * | 11/1996 | Almgren et al. ............. 455/69 |
| 5,623,484 A | * | 4/1997 | Muszynski ................... 370/335 |
| 5,732,328 A | * | 3/1998 | Mitra ......................... 455/69 |
| 5,732,334 A | * | 3/1998 | Miyake ....................... 455/126 |
| 5,838,269 A | * | 11/1998 | Xie ............................ 341/139 |
| 5,852,782 A | * | 12/1998 | Komatsu ..................... 455/522 |
| 5,873,028 A | * | 2/1999 | Nakano et al. ............... 455/69 |
| 5,878,328 A | * | 3/1999 | Chawla et al. .............. 455/67.1 |
| 6,021,125 A | * | 2/2000 | Sakoda et al. ............... 370/345 |
| 6,131,013 A | * | 10/2000 | Bergstrom et al. ............ 455/63 |

FOREIGN PATENT DOCUMENTS

| EP | 0709973 | 5/1996 | ........... H04B/7/005 |
|---|---|---|---|
| EP | 0741467 A | * 11/1996 | ........... H04B/7/26 |

\* cited by examiner

*Primary Examiner*—Thanh Cong Le
*Assistant Examiner*—C. Chow
(74) *Attorney, Agent, or Firm*—Jenkens & Gilchrist, A Professional Corporation

(57) ABSTRACT

A method and system for quality-based transmission power control in a cellular communications system are disclosed, whereby a network operator can specify the transmission quality requirements using a measurement that better reflects the actual quality perceived by the users. All transmitter power levels in the network can be controlled by identical power regulators, each of which can adapt to individual traffic situations in order to achieve the specified quality. For example, in a GSM frequency-hopping network, the FER together with the parameters estimated from the current traffic situation, are mapped onto a target C/I, which in turn, the power control algorithm strives to achieve. Consequently, the power regulators can adapt to the traffic situation experienced by each receiver.

34 Claims, 19 Drawing Sheets

| Delay | $n=0$ | $n=1$ | $n=2$ |
|---|---|---|---|
| β | 2.000 | 1.000 | 0.618 |

FIG. 21
| Delay | $n = 0$ | $n = 1$ | $n = 2$ |
|---|---|---|---|
| $\beta$ | 1.632 | 0.503 | 0.431 |
FIG. 22A
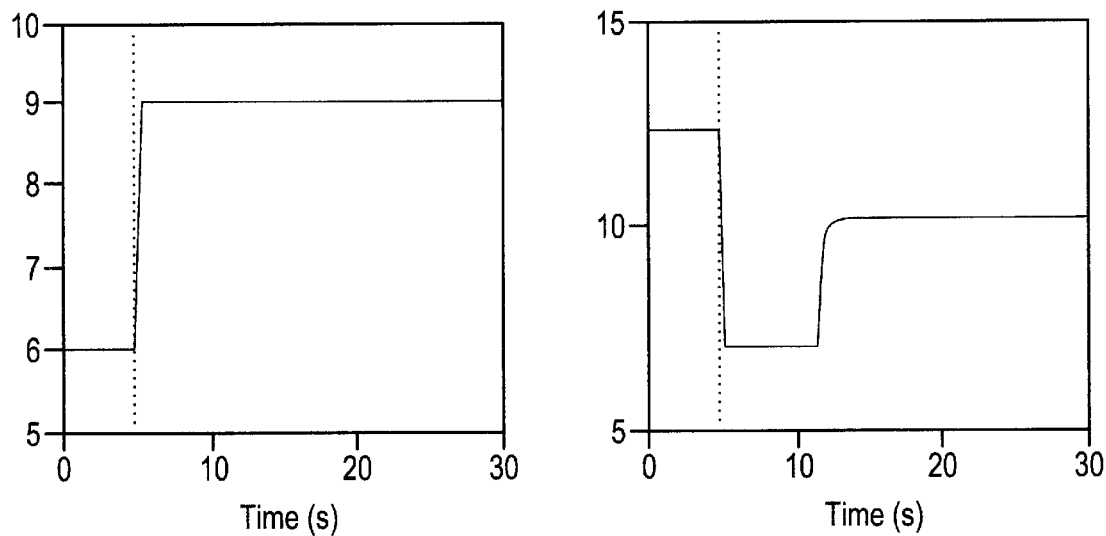
Situation 1
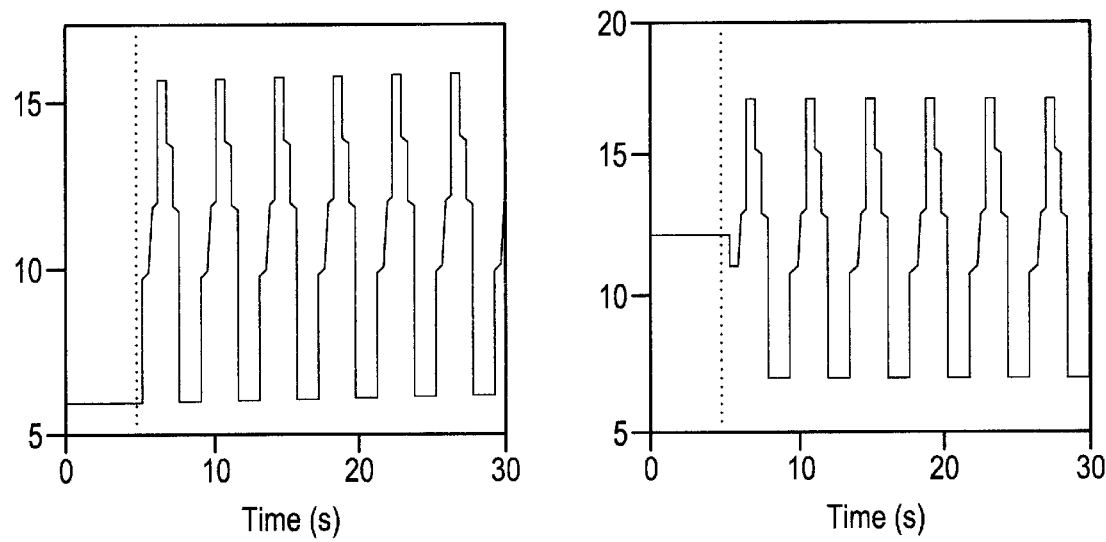
Situation 2

Situation 1

Situation 2

Situation 1

Situation 2

METHOD AND SYSTEM FOR QUALITY-BASED POWER CONTROL IN CELLULAR COMMUNICATIONS SYSTEMS

BACKGROUND OF THE INVENTION

1. Technical Field of the Invention

The present invention relates in general to the mobile communications field and, in particular, to a method and system for improving the quality of transmissions in cellular communications systems.

2. Description of Related Art

Due to the rapid expansion of the wireless mobile market, and the increased need for wideband multimedia services, the available bandwidth has to be better utilized. A common strategy used for greater bandwidth utilization in Frequency Division Multiple Access (FDMA) and Time Division Multiple Access (TDMA) systems is to reuse the frequencies allocated in the network, commonly referred to as "frequency reuse". However, a problem with the frequency reuse strategy is that it creates interference between transmitters that needs to be counteracted.

One method used to reduce such interference is to control the power levels of the transmitted radio signals. For example, interference between different call connections using the same radio channel in a mobile radiotelephony system can be reduced by controlling the transmission power levels of the mobile stations (MSs) and base stations (BSs) in the system. The goal of such an approach is to ensure that only the transmission power necessary to maintain satisfactory call quality is used. When one communicator (MS or BS) thus controls its transmission power, the other communicators will experience lower interference from the first communicator, compared to the situation where it would be using maximum power. In turn, the system capacity can be increased (allegedly by about 70% compared to an unregulated system). In this regard, an important reason to keep the transmitted power of an MS as low as possible is to reduce the energy it consumes.

U.S. Pat. No. 4,485,486 to Webb et al. discloses a prior radiotelephone system in which power regulation is performed relatively infrequently, and is based on the questionable assumption that the disturbance level is more or less constant. The MS's transmission power is only coarsely controlled, and the objective is to keep the received signal above the disturbance level. However, in practice, the disturbance level varies considerably in both time and place. Consequently, this algorithm is based on incorrect assumptions.

Most power control algorithms proposed to date, strive to balance the carrier-to-interference ratios (C/Is) on each channel so that every MS or BS achieves the same C/I. As disclosed in "Performance of Optimum Transmitter Power Control in Cellular Radio Systems," by J. Zander, *IEEE Transactions on Vehicular Technology*, 41(1):57–62, 1992, for every traffic scenario in a cellular communications system, there is a maximum C/I that can be obtained by all receivers at the same time. If all pertinent information were to be available at one place, a global (or centralized) power control approach is proposed that assigns the transmission power levels so that this maximum C/I is achieved. However, such an approach requires extensive signaling in the network. Therefore, it is more desirable to perform power control in a distributed fashion, wherein only local measurements are used. Such a requirement is fulfilled by the "Modified Distributed Balancing Algorithm" (MDBA) disclosed in "A Simple Distributed Autonomous Power Control Algorithm and its Convergence," by G. J. Foschini and Z. Miljanic, *IEEE Transactions on Vehicular Technology*, 42(4):641–646, 1993.

The problem associated with the above-described approach is to assign an appropriate target C/I that the power control algorithm can strive to achieve. If the target value is set too high, the transmission power levels might be increased to maximum levels determined by the physical limits (constraints) of the system, without achieving the specified target level. In that regard, an attempt to employ graceful degradation in such systems has been disclosed in U.S. Pat. No. 5,574,982 to Almgren et al., and "Power Control in a Cellular System," by M. Almgren, H. Andersson, and K. Wallstedt, *Proceedings of the 44th Vehicular Technology Conference*, Stockholm, Sweden, May 1994. This approach was further refined in "Soft Dropping Power Control," by R. D. Yates, S. Gupta, C. Rose, and S. Sohn, *Proceedings of the 47th Vehicular Technology Conference*, Phoenix, Ariz., May 1997.

In "Frequency Hopping GSM," by C. Carneheim, S.-O. Jonsson, M. Ljungberg, M. Madfors, and J. Näslund, *Proceedings of the 44th Vehicular Technology Conference*, Stockholm, Sweden, May 1994, a different power control approach has been disclosed in which the transmission power levels are based on signal attenuation and C/I. The specific case where the output power levels have an upper limit, $p_{max}$, has been studied in "Constrained Power Control," by S. Grandhi, J. Zander, and R. Yates, *Wireless Personal Communications*, 1:257–270, 1995, where the Distributed Constrained Power Control (DCPC) algorithm has been disclosed. Additional complexity arises considering that the transmission power levels are not only limited by hardware constraints but also quantized. Therefore, only a discrete set of power levels can be used. In any event, the above-described power control algorithms may be accompanied by a Dynamic Channel Allocation (DCA) algorithm which assigns appropriate channels in order to further decrease interference.

A major problem with the existing transmission power regulation approaches is that they are based on the assumption that the transmission quality is dependent only on the C/I. However, although this assumption may be true for analog systems, it is not true for digital systems. Instead, for digital systems, a transmission quality measure is needed that describes the effects of coding, frequency hopping, interleaving, etc., if these functions are being used. Consequently, it may be desirable to use such a quality measure to specify quality requirements instead of directly specifying the target C/I. Intuitively, one realizes that such an algorithm should be able to adapt to the specific interference circumstances at each receiver.

In "Improved Quality Estimation for Use in Simulation of Wireless TDMA Systems," *Proceedings of the 6th International Conference on Universal Personal Communications*, by H. Olofsson, San Diego, USA, October 1997, transmission quality in TDMA systems is described in terms of Frame Erasure Rate (FER), which better reflects the actual quality perceived by the user. As such, use of the FER for transmission quality purposes is an appropriate choice for the Global System for Mobile Communications (GSM).

The C/I of a connection is not measurable directly. Instead, the measurement reports can comprise a Quality Indicator (QI) and a Received Signal Strength Indicator (RSSI). As such, both of these values are quantized, and a great deal of pertinent information is lost in the quantization process. The measurement reports may comprise other measures, but in the GSM, these values are used, and denoted as "RXQUAL" and "RXLEV", respectively. Consequently, the C/I used in the power control algorithm has to be estimated from these values. However, the approach used today is not very accurate, and thus it is desirable to extract as much pertinent information as possible from the measurement reports to increase this accuracy.

In a practical situation, there are physical limitations in the transmitters, receivers, and the network itself. The transmission power levels are not only limited but also quantized. Therefore, only a discrete set of power levels can be used. The signaling, and the signal strength and quality measurements involved take up considerable amounts of time, which result in significant time delays in the network. Some standards only allow this report and control signaling at certain time intervals, resulting in additional delays. The effects of these delays can cause oscillations in the transmission powers, if the controller parameters have not been properly chosen. As described in detail below, the present invention successfully resolves these problems.

SUMMARY OF THE INVENTION

A method and system for quality-based transmission power control in a cellular communications system are provided, whereby a network operator can specify the transmission quality requirements using a measurement that better reflects the actual quality perceived by the users. All transmitter power levels in the network can be controlled by identical power regulators, each of which can adapt to individual situations in order to achieve the specified quality. For example, in a GSM frequency-hopping network, the FER together with parameters estimated from the current traffic situation, are mapped onto a target C/I, which in turn, the power control algorithm strives to achieve. Consequently, the power regulators can adapt to the traffic situation experienced by each receiver.

An important technical advantage of the present invention is that the cellular system's transmission quality requirements can be specified using a measure that better reflects the actual quality perceived by the users.

Another important technical advantage of the present invention is that an estimator is used to extract as much pertinent information as possible from the measurement reports, such as interference characteristics, path loss, the carrier, and the C/I.

Still another important technical advantage of the present invention is that the use of an estimator and quality mapper reduces the function of the power control algorithm to what it is good at, namely to assign transmitter power levels so that the (estimated) C/I will accurately track the (computed) target C/I. Thereby, the specified transmission quality will be achieved.

Yet another important technical advantage of the present invention is that it includes methods for choosing appropriate parameter values, in order to prevent instability and counteract the effects of time delays.

Yet another important technical advantage of the present invention is that the power control algorithm compensates for the effects of the physical constraints in the cellular system, on the quality of the transmission.

Still another important technical advantage of the present invention is that quality-based power control can be readily implemented in existing systems. The primary component to be updated is the software in the BSs, where the output power levels are computed. Consequently, the present invention can be implemented without affecting the existing technical standards, the MSs, radio interfaces, or BS transmitters, which is extremely important due to the great number of terminals in use today.

BRIEF DESCRIPTION OF THE DRAWINGS

A more complete understanding of the method and apparatus of the present invention may be had by reference to the following detailed description when taken in conjunction with the accompanying drawings wherein:

FIG. 21 is a Table that illustrates the limits of a controller parameter β; and

FIGS. 22A–22C are related diagrams that illustrate the recovery ability of different power control algorithms subjected to a step increase in interference, including a preferred algorithm with anti-reset windup.

DETAILED DESCRIPTION OF THE DRAWINGS

The preferred embodiment of the present invention and its advantages are best understood by referring to FIGS. 1–22 of the drawings, like numerals being used for like and corresponding parts of the various drawings.

Essentially, in accordance with the present invention, a quality-based transmission power control method and system are provided in a cellular communications system, whereby a network operator can specify the transmission quality requirements using a measurement that better reflects the actual quality perceived by the users. All transmitter power levels in the network can be controlled by identical power regulators, each of which can adapt to individual traffic situations in order to achieve the specified quality. For example, in a GSM frequency-hopping network, the FER together with the parameters estimated from the current traffic situation, are mapped onto a target C/I, which in turn, the power control algorithm strives to achieve. Consequently, the power regulators can adapt to the traffic situation experienced by each receiver.

Figure 1:
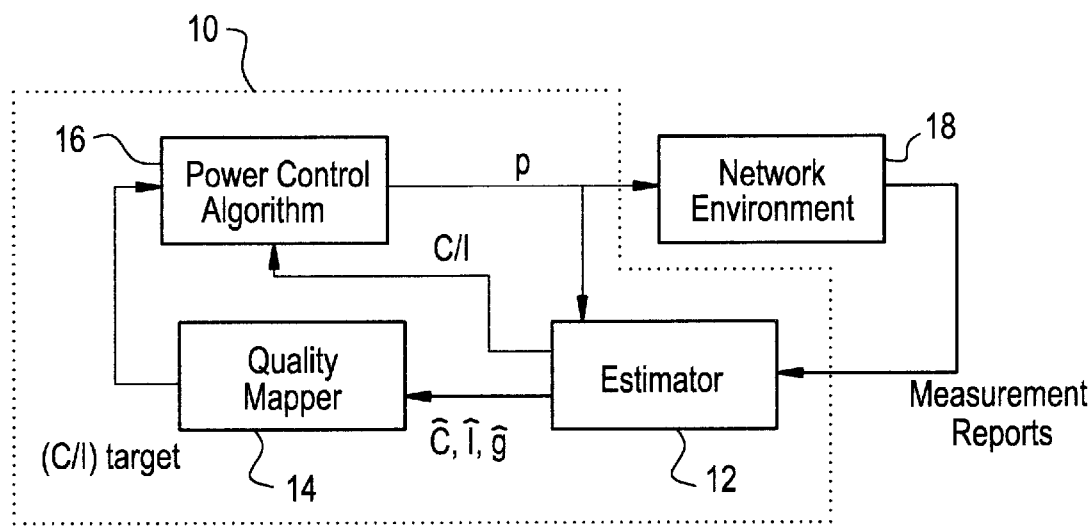
FIG. 1 is a simplified block diagram of a power regulator that can be used to control transmission power levels for each of a plurality of MSs and BSs in a mobile communications system, in accordance with an exemplary embodiment of the present invention.

Specifically, FIG. 1 is a simplified block diagram of a power regulator 10 that can be used to control transmission power levels for each of a plurality of MSs and BSs in a mobile communications system, in accordance with an exemplary embodiment of the present invention. For example, a power regulator 10 can be located in some or all of the MSs (101, 102, 103, etc.) and BSs (104, 105, 106, etc.) shown in the exemplary mobile communications system 100 illustrated by FIG. 2. Another possibility is that some, or all, of the computations in the power regulator in an MS can take place in the BSs. In that case, pertinent information is transmitted between the MS and the location of the software. However, it should be understood that the invention is not intended to be limited to any particular type of mobile communications system or specific MS or BS arrangements, and can be used to control transmission power levels in any appropriate mobile communications environment where individual traffic situation adaptability and quality-based power control are desired.

Referring to FIG. 1, for this embodiment, exemplary power regulator 10 (denoted by the dashed line) includes an estimator 12, quality mapper 14, and power control algorithm 16. The "environment" block 18 represents all possible effects from a network, as experienced by each MS or BS in the system 100, such as, for example, physical or hardware constraints, time delays, interference, path loss, fading, etc.

Figure 3:
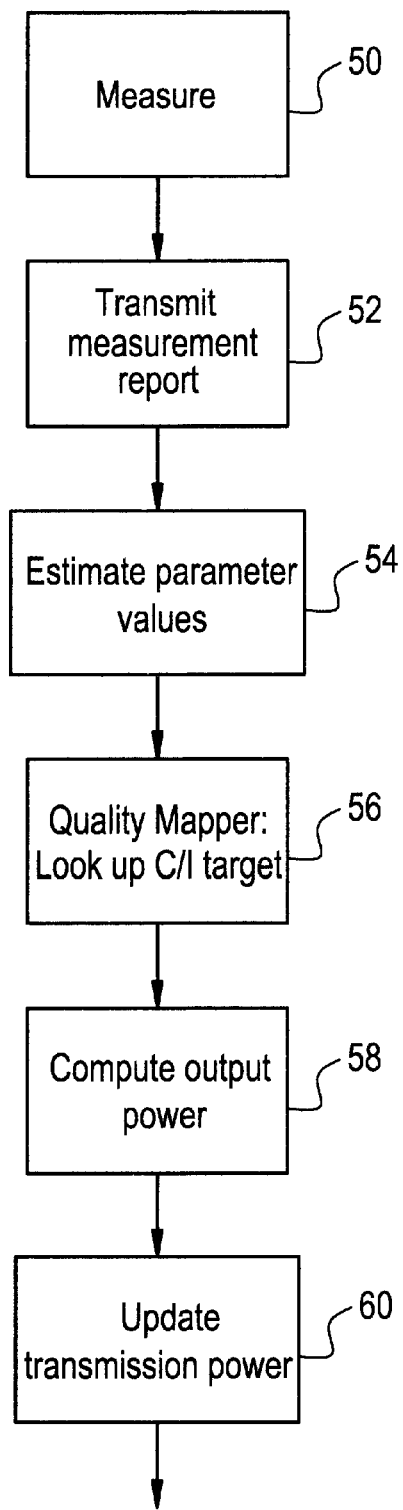
FIG. 3 is a high level flow diagram that illustrates an exemplary method that can be used to implement the exemplary power regulator algorithm shown in FIG. 1, in accordance with a preferred embodiment of the present invention.

As such, FIG. 3 is a high level flow diagram that illustrates an exemplary method that can be used to implement the exemplary power regulator algorithm (10) shown in FIG. 1, in accordance with a preferred embodiment of the present invention. For simplicity, the focus is on the downlink of a specific connection. Preliminarily, at step 50, the MSs conduct typical signal strength and quality measurements. At step 52, the MSs transmit the measurement information in measurement reports to the power regulator (10) via the network. In general, the primary function of the estimator 12 is to extract as much relevant information as possible from measurement reports, given a regulated output power level, p. For example, these measurements can be made, and reported regularly or on demand to the power regulator, by the associated MS or BS in the system 100. Since both the RSSI and QI are dependent upon the interference and path loss (e.g., from environment 18), the interference, I, and the path loss, g, can be estimated (step 54) to compile the carrier, C=p+g (step 58) and the C/I. The power control algorithm 16 updates the computed output power to obtain the transmission power level to be output (step 60). Notably, the distribution of the interference, I, can be described by several parameters in the general case.

The primary function of the quality mapper 14 is as follows. If it is desirable to use a different quality measure, the specified quality value to be used is mapped tag onto a quantity that is suitable for use in the power control algorithm 16. For this embodiment, the estimated quantities (from the estimator 12) and the specified quality value (from an operator) are mapped onto the target C/I (step 56), which is carried out in the quality mapper 14. Consequently, in accordance with the present invention, when the traffic situation is changing over time, so are the estimated quantities. Therefore, in order to maintain the specified quality at a particular (MS or BS) receiver, the target C/I is adapted to the traffic situation experienced by that receiver.

The primary function of the power control algorithm 16 is to assign transmitter power levels (for a BS or MS) so that the estimated C/I input from the estimator 12 will track the target C/I, as computed by the quality mapper 14, and thereby achieve the specified quality. A known power control algorithm can be used for power control algorithm 16, such as, for example, one of the algorithms disclosed in: "A Simple Distributed Autonomous Power Control Algorithm and its Convergence," by G. J. Foschini and Z. Miljanic, *IEEE Transactions on Vehicular Technology*, 42(4): 641–646, 1993; U.S. Pat. No. 5,574,982 to Almgren et al.; and "Power Control in a Cellular System," by M. Almgren, H. Andersson, and K. Wallstedt, *Proceedings of the 44th Vehicular Technology Conference*, Stockholm, Sweden, May 1994. However, a preferred power control algorithm is described below that can be used for more specific network environments and embodiments (e.g., in a frequency-hopping GSM).

As an aside, it is also important to be able to identify the hardware constraints and time delays present in the network environment (18). In accordance with the present invention, if these effects can be identified, they can be reduced or eliminated by applying an anti-reset windup function and choosing appropriate parameter values, as described in more detail below.

Figure 4:
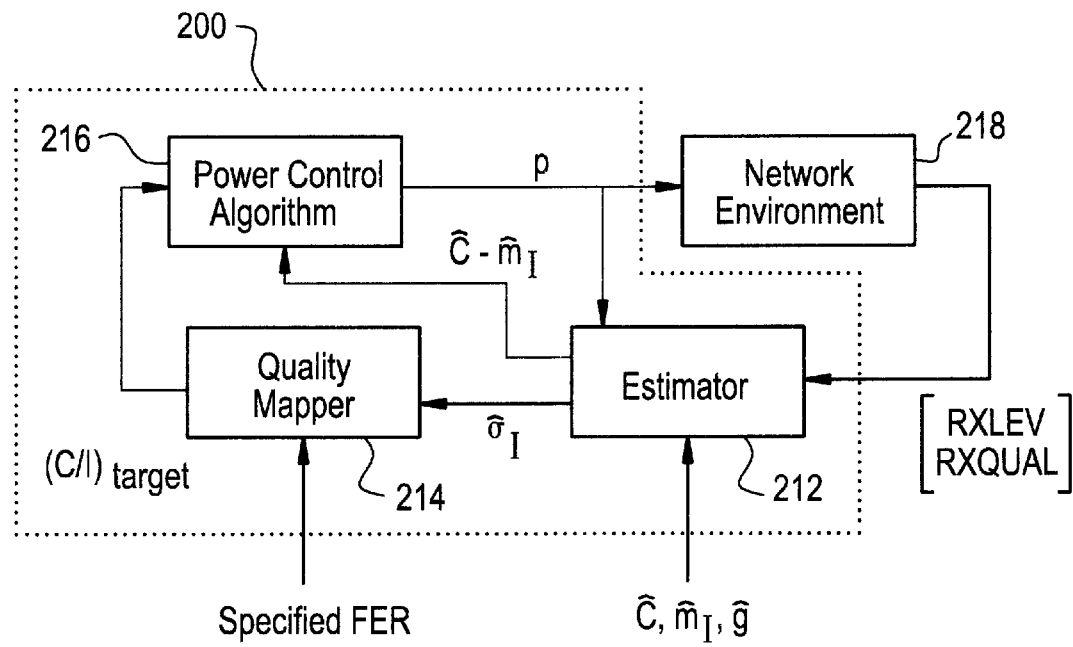
FIG. 4 is a simplified block diagram of a power regulator that can be used to control transmission power levels for each of a plurality of MSs and BSs in a frequency-hopping TDMA mobile communications system, in accordance with a second exemplary embodiment of the present invention.

FIG. 4 is a simplified block diagram of a power regulator 200 that can be used to control transmission power levels for each of a plurality of MSs and BSs in a frequency-hopping TDMA mobile communications system (e.g., frequency-hopping GSM), in accordance with a second exemplary embodiment of the present invention. For this embodiment, power regulator 200 includes an estimator 212, a quality mapper 214, and a power control algorithm 216. As such, each of these component algorithms of the power regulator 200 can be realized in software running in a processor associated with the particular MS or BS involved. Note that a processor associated with a MS can be located elsewhere (e.g., in the connected BS). The "environment" block 218 represents all possible effects from a network, as experienced by each MS or BS in a GSM system (e.g., as shown in system 100 of FIG. 2).

Figure 5A:
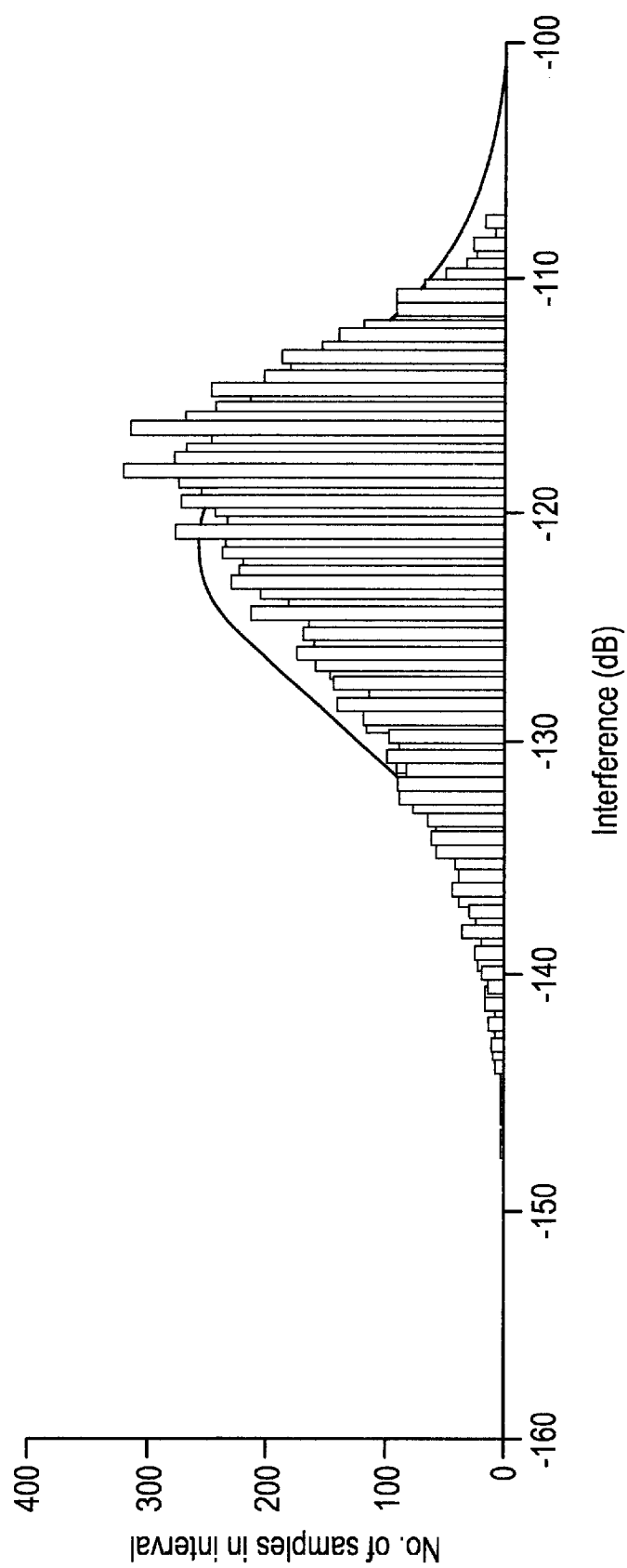
FIGS. 5A–5C are related diagrams that illustrate interference distribution for different channel utilization conditions in a random frequency-hopping network.
Figure 5B:
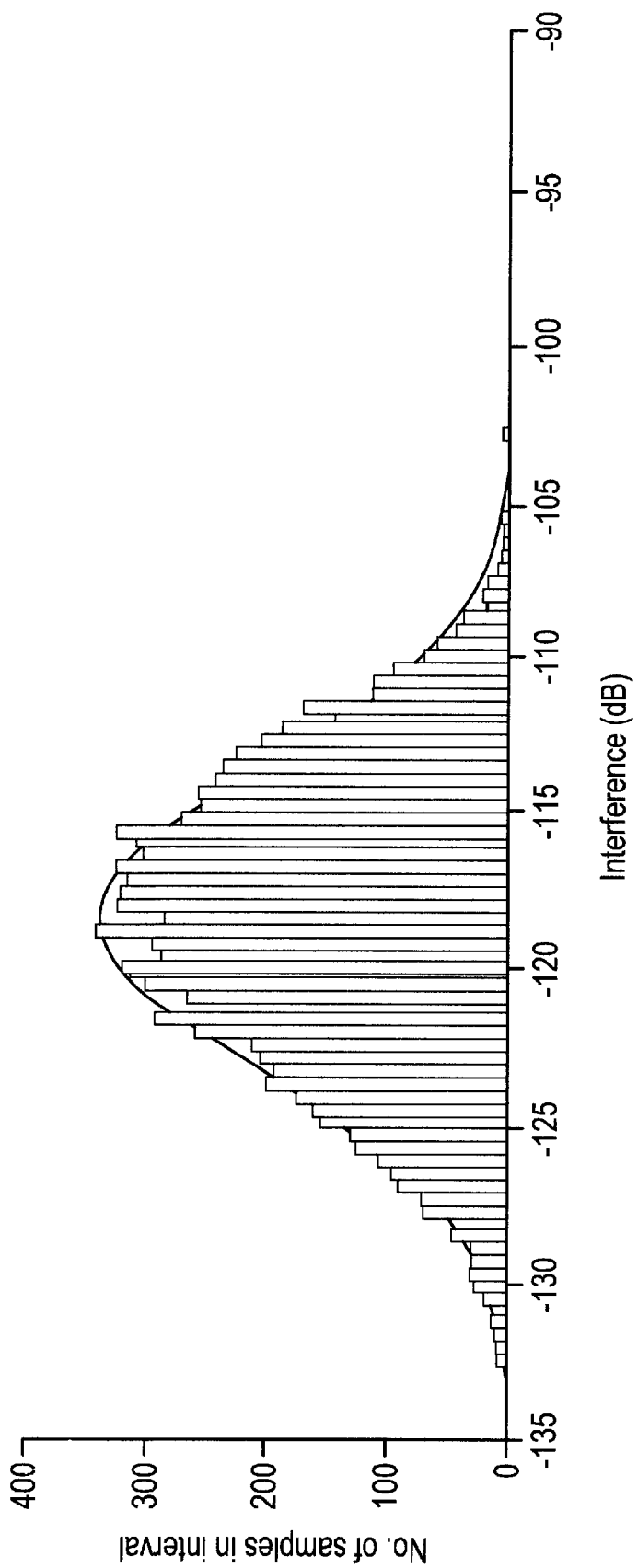
Figure 5C:
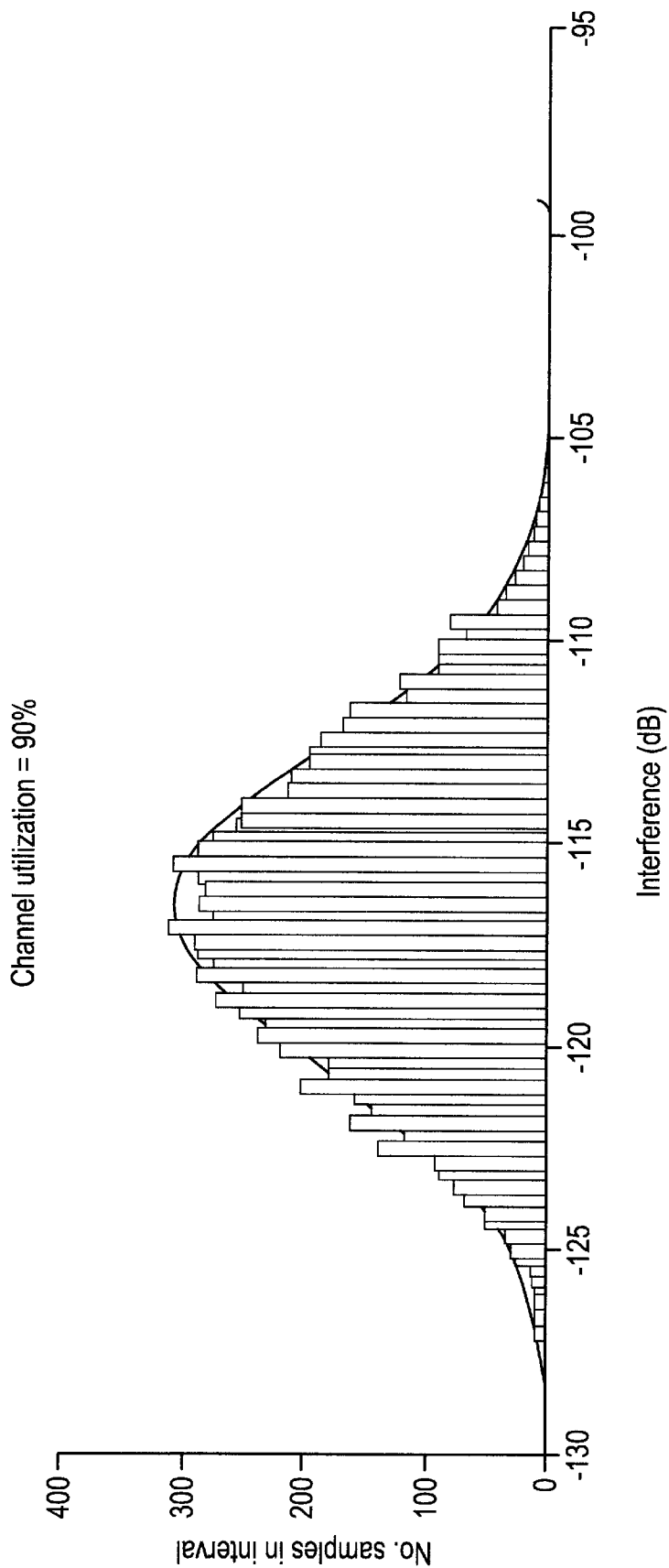

When characterizing the interference distribution (in the network environment 218), a model can be used. In an exemplary embodiment, random frequency-hopping is assumed, and it is also assumed that the interference is constant during a burst. The transmitted signals are subject to path loss, shadow fading, Rayleigh fading, and thermal noise. The results of such conditions are illustrated in FIGS. 5A–5C, which are diagrams that show the interference distribution in a random frequency-hopping network. The channel utilization (or interference load) parameter refers to the extent to which a channel is used. From FIGS. 5A–5C, it can be concluded that the interference experienced by a user in the network is an approximate normal distribution, especially when there are many users in the network. Consequently, the interference distribution can be characterized by its mean value, $m_I$, and its standard deviation, $\sigma_I$. This result holds for a burst's time scale. In other words, for each burst, the interference is given by a realization of this normal distribution. As such, the present estimation approach used for estimator 212 advantageously describes the interference more thoroughly and accurately than prior estimation approaches, because the prior approaches characterized the interference only by its mean value.

Figure 2:
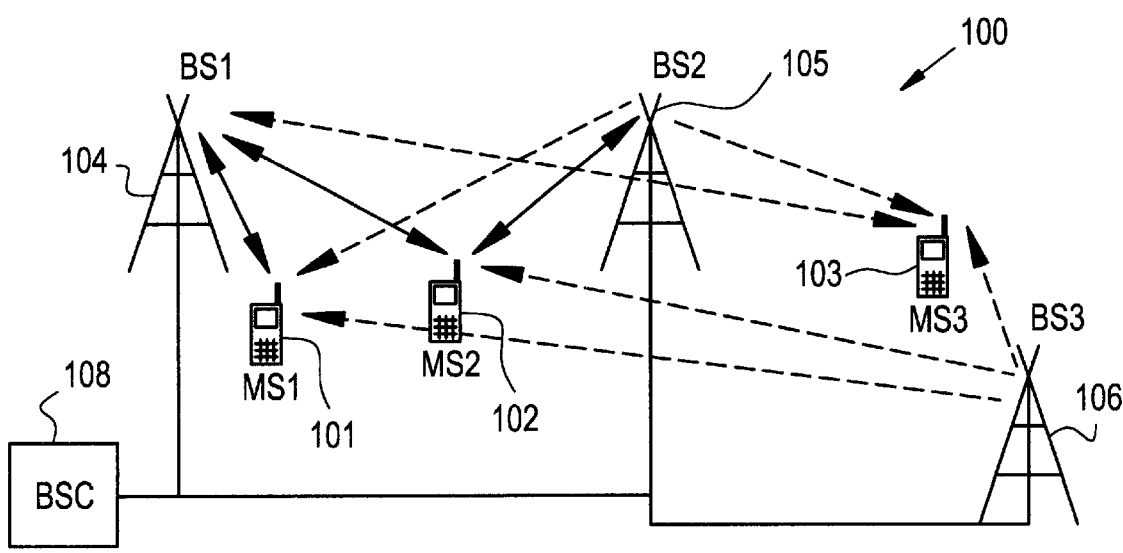
FIG. 2 is a simplified diagram of an exemplary mobile communications system that can be used to implement the power regulator shown in FIG. 1.

In the GSM, the overall power control system is located in the base station controller (BSC), such as the BSC 108 shown in FIG. 2. The inputs to a GSM BSC, which are relevant for the estimator 212, are the measurement reports, comprising, for example, RXLEV and RXQUAL. Under the above-described conditions, the block diagram for the power regulator 10 in FIG. 1 can be replaced by the block diagram for the power regulator 200 shown in FIG. 4.

In order to better understand the function of estimator 212 shown in FIG. 4, it is useful at this point to provide an overview of the Maximum Likelihood (ML) estimation method. The ML method is based on the premise that different probability density functions generate different data samples, and any given data sample is more likely to have come from a particular distribution than from others.

As an example of this premise, let $f(x;\theta)$ represent the probability density function of a certain stochastic variable, X. For example, we can obtain the following expressions:

$$X \epsilon Exp(\theta) \tag{1}$$

$$f_X(x;\theta) = \frac{1}{\theta} e^{-x/\theta} \tag{2}$$

Let the true value of $\theta$ be equal to 5, and assume that a measurement, $x_1=4.3$, has been given. In order to estimate $\theta$, the likelihood function can be expressed as:

$$l_1(\theta) = f_X(x_1;\theta) = \frac{1}{\theta} e^{-x_1/\theta} \tag{3}$$

Figure 6A:
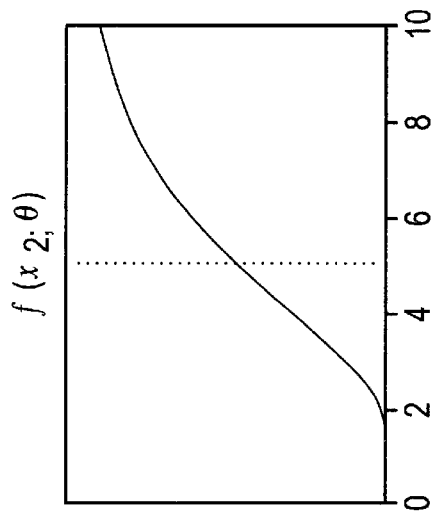
FIGS. 6A–6D are related diagrams that illustrate a set of different likelihood functions.
Figure 6B:
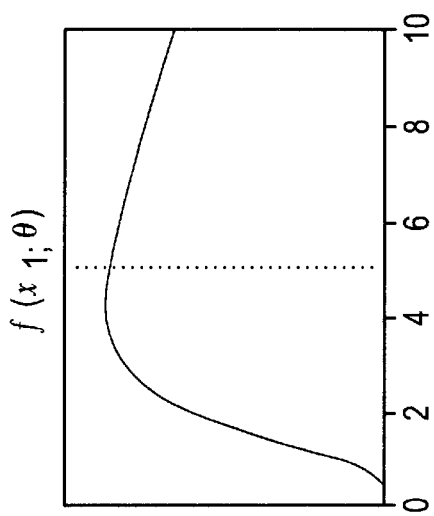

This likelihood function is illustrated in FIG. 6A. The estimate of $\theta$ is the value that maximizes this function. In the case of only one data sample, the estimated parameter has the same value as the data, since the maximum of the expression in Equation (3) is $x_1$.

Now assume that a second measurement, $x_2=12.3$, has been given. However, instead of proceeding as in the case of only one sample (e.g., see FIG. 6B), a better choice of likelihood function is to use the joint probability function, which can be formed as:

$$l_2(\theta) = f_X(x_1;\theta) f_X(x_2;\theta) = \frac{1}{\theta} e^{-(x_1+x_2)/\theta} \tag{4}$$

Figure 6C:
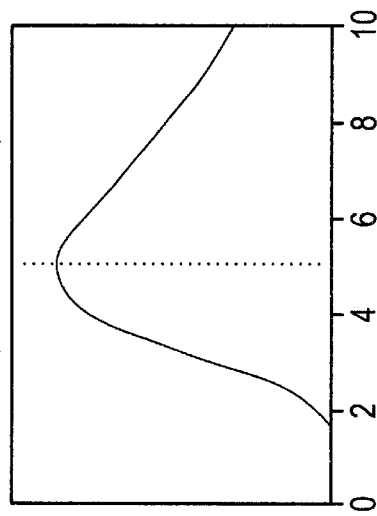

This function is plotted in FIG. 6C. By determining the value of $\theta$ where this likelihood function has its maximum, an estimate results that is based on both measurements, $x_1$ and $x_2$.

Figure 6D:
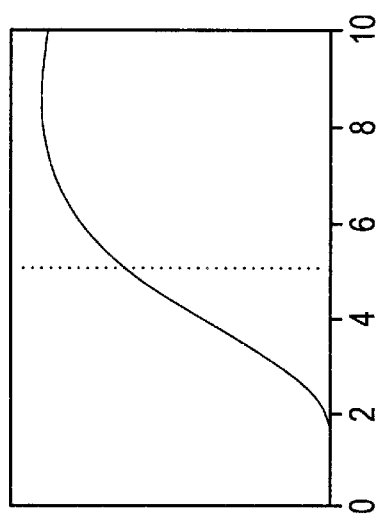
Figure 7A:
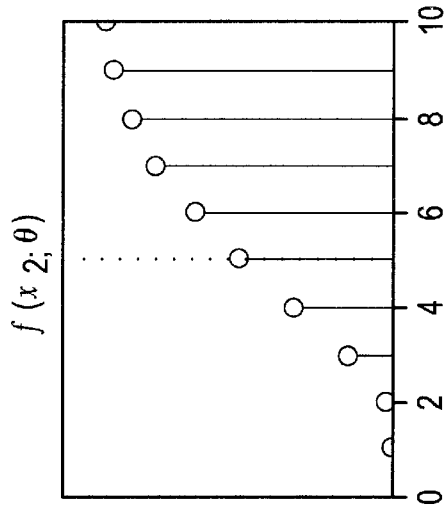
FIGS. 7A–7D are related diagrams that illustrate the set of different likelihood functions shown in FIGS. 6A–6D for finite sets of points (gridpoints)
Figure 7B:
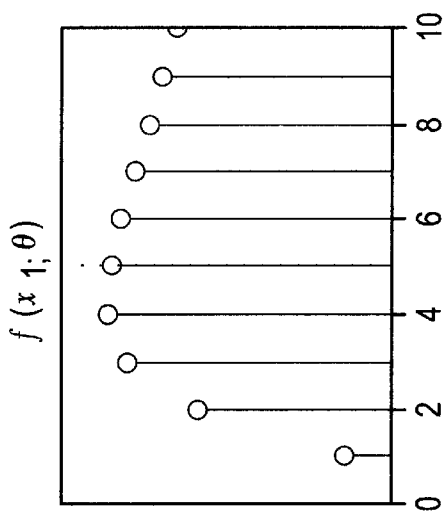
Figure 7C:
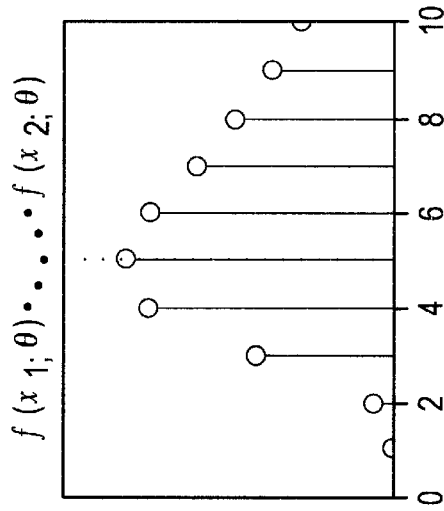
Figure 7D:
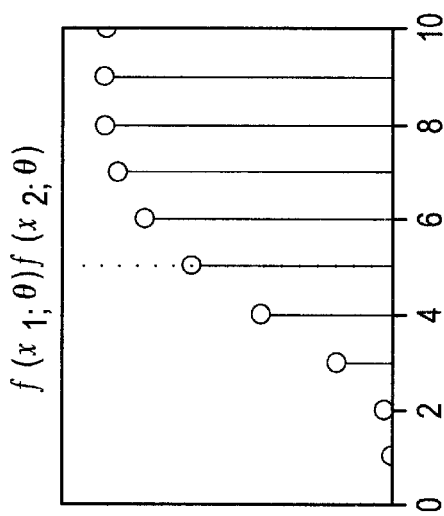

As the number of data samples increases, the likelihood function becomes more and more centered around the true value of $\theta$, and the peak decreases in width. As illustrated in FIG. 6D, as little as five data samples yields a good estimation of $\theta$. As such, a generalization of the likelihood function can be expressed as:

$$l_t(\theta) = \prod_{i=1}^{t} f_X(x_i;\theta). \tag{5}$$

In order to implement the algorithm characterized by Equation (5), the likelihood function would have to be stored for an infinite number of points. Of course, this approach appears impossible since computers have limited memory. Instead, however, a point-mass filter can be used. In other words, the value of the likelihood function is saved for only a finite number of points, referred to as gridpoints (i.e., the points in FIGS. 7A–7D).

In order to better understand this preferred approach, an intuitive comparison can be made for the example described above, by comparing FIGS. 6 and 7. It can be seen that when attempting to determine the maximum value, some precision is lost. For example, in FIG. 6A, the $\theta$ value is estimated as 4.3, and as 4 in FIG. 7A. However, if the likelihood function is varying slowly enough, the gridpoints will capture the overall behavior, and thus the advantage of having higher gridpoint density is increased precision.

An adaptive algorithm (one that is able to track a varying parameter) can be used for ML estimation. For example, assume that the parameter, $\theta$, is changing over time, and an adaptive algorithm is to be used for estimation. Since the latest measurements contain more current information, the adaptive algorithm used should rely more on the latest measurements. In order to accomplish this adaptive use of the latest measurements, a "forgetting" factor can be introduced into the algorithm. Consequently, the likelihood function in Equation (5) with a "forgetting" factor, becomes:

$$l_t(\theta) = f_X(x_t;\theta) f_X(x_{t-1};\theta)^\lambda \cdots f_X(x_1;\theta)^{\lambda^{t-1}}. \tag{6}$$

By converting Equation (6), the following expression can be used in an algorithm to implement the exponential "forgetting" behavior of the likelihood function recursively:

$$log\, l_t(\theta) = log\, f_X(x_t;\theta) + \lambda log\, l_{t-1}(\theta). \tag{7}$$

As described earlier, the estimator (212) estimates the mean and standard deviation of the interference, and the path loss. These two parameters can then be used together with the transmission power to derive the carrier, $C=p+\hat{g}$, and the C/I estimate, $\hat{C}/\hat{I}=C-\hat{m}_I$ (where $\hat{g}$ is the path loss, and $\hat{m}_I$ is the estimated mean value of the interference distribution). Since the interference characteristics vary with the traffic situation and thus also with time, these parameters are time-dependent. Furthermore, the path loss is also time-dependent due to the movements of the MSs. Consequently, the estimator (212) has to be able to track this time-variation.

Notably, the measurement values, RXLEV and RXQUAL, can be seen as realizations of two stochastic variables, which in turn are dependent on the interference, path loss, and the transmission power level used. As such, the ML estimation approach described earlier dealt with the example where a probability function of one stochastic variable depends on one parameter. However, that approach can be generalized to treat several stochastic variables that are dependent on more than one common parameter. Consequently, measurements of the values, RXLEV and RXQUAL, can be used to estimate the mean of the interference distribution ($m_I$), the standard deviation of the interference distribution ($\sigma_I$), and the path loss (g).

First, the probability functions for RXLEV and RXQUAL as functions of the parameters $m^I$, $\sigma_I$, and g have to be ascertained. In general, the analytical expressions for these functions are much more complex than for the relatively simple example given above (e.g., Equation (2)). Instead, these functions can be computed or measured in a grid that covers the area of interest. For each point in the grid (gridpoint), a parameter triplet is used to generate a C/I sequence, which incorporates additional effects such as, for example, Rayleigh fading. This sequence can then be transformed into a Bit Error Rate (BER) sequence, such as the sequence disclosed in "Improved Quality Estimation for Use in Simulation of Wireless TDMA Systems," by H. Olofsson, *Proceedings of the 6th International Conference on Universal Personal Communications*, San Diego, USA, October 1997. This BER sequence is then mapped onto an RXQUAL sequence, in accordance with the GSM standard for RXQUAL.

A similar procedure can be used for the RXLEV sequence, except that the RXLEV procedure is based on signal strength (strength of the desired signal plus the interference) sequence. By repeating these two procedures (for RXQUAL and RXLEV) several times, the probability functions for RXQUAL and RXLEV (as functions of the parameters $m_I$, $\sigma_I$, and g) can be formed. Note that generation of the RXQUAL probability function can be based on a model of the coding, modulation, etc., to be used.

For the estimator (212) algorithm, as much pertinent information as possible should be extracted from the incoming RXQUAL and RXLEV measurements (from environment 218), given the transmission power level (p) used. For this embodiment, an ML estimator is used. As such, assume that a sequence of measurement reports (e.g., RXLEV and RWQUAL) are input to the estimator 212. The ML estimates, $\hat{m}_I$, $\hat{\sigma}_I$, and $\hat{g}$ are the parameter values that maximize the probability of obtaining this particular measurement report sequence. The more current likelihood function describes the knowledge gained from previous measurement reports. The updated likelihood function, from which the new estimates are computed, is formed by weighting together the information in a "new" measurement report with the current likelihood function (see Equation (7)). In this way, the "old" measurement reports can be "forgotten" exponentially. Note that this approach requires knowledge of the probability functions for RXLEV and RXQUAL (as functions of the parameters $m_I$, $\sigma_I$, and g), which can be obtained once and for all using the procedure described above.

There still remains the fact that the parameters to be estimated are changing at different rates. For example, the standard deviation of the interference ($\sigma_I$) is most likely to change more slowly than the path loss (g). Consequently, by separately filtering each estimated parameter, smoothed estimates can be obtained, along with an opportunity to adapt a "forgetting" capability in each of these filters. This smoothing capability can be accomplished in accordance with the following expression:

$$\hat{g}(t+1) = \lambda_g \hat{g}_{ML}(t+1) + (1-\lambda_g)\hat{g}(t), \quad (8)$$

where $\hat{g}_{ML}$ is the estimate of g from the ML estimator (212), and $\hat{g}$ is the estimate of g at time t. By selecting different $\lambda$ factors for each estimated quantity, a smoothing of the estimate can be obtained that is adapted to how fast the quantity is expected to change. Note that in operation (without limiting the scope of the invention), if alternate coding or modulation is used in the system, a corresponding model for such an alternative may be used. If numerous coding and modulation schemes are used in a system, the ML estimator (212) can switch between the corresponding probability functions as needed.

Figure 8:
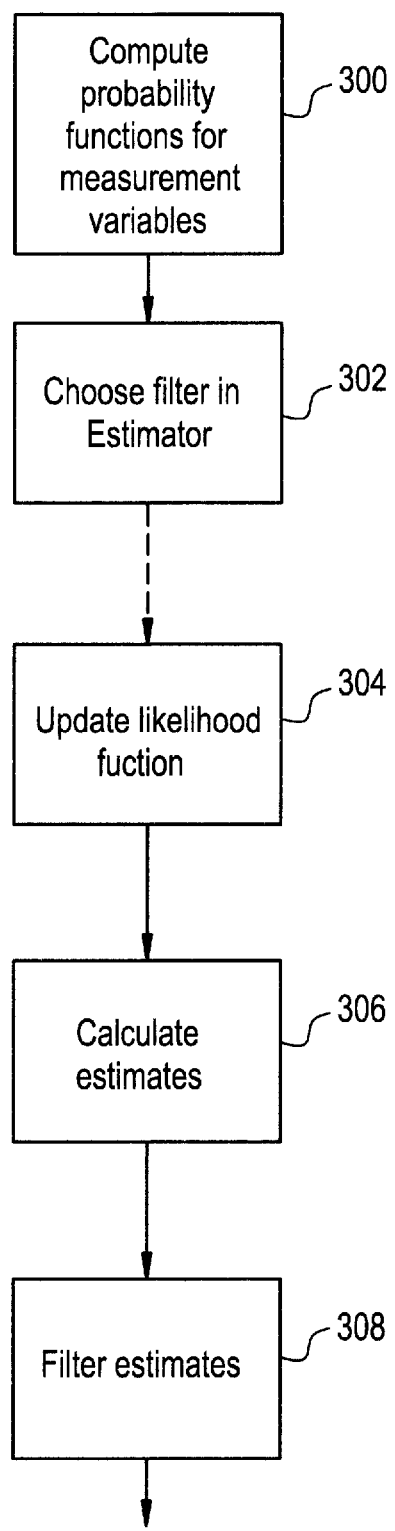
FIG. 8 is a high level flow diagram that describes an exemplary method that can be used to implement the estimator algorithms illustrated by FIGS. 1 and 4.
Figure 10:
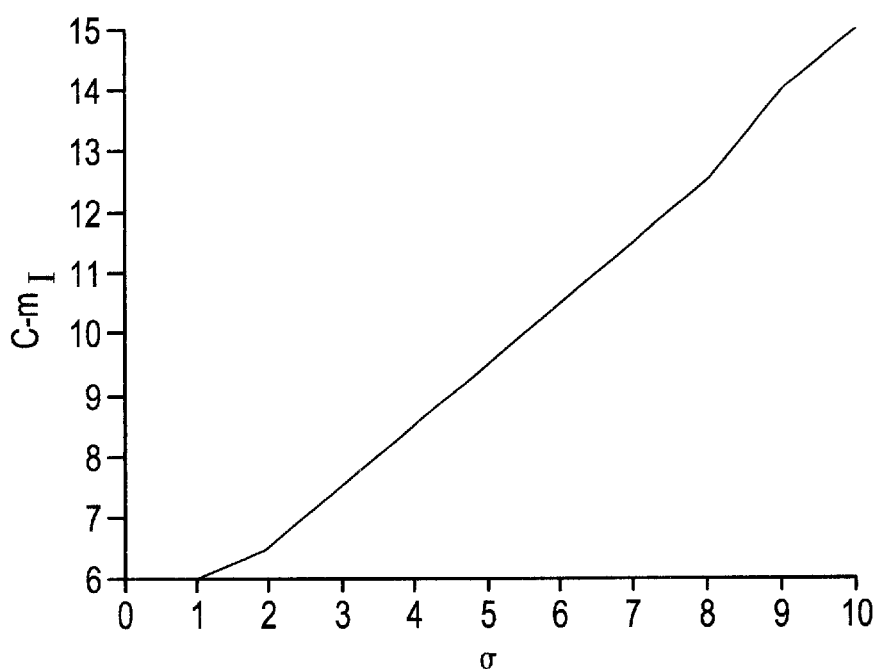
FIG. 10 is a diagram that illustrates threshold values for certain carrier-to-interference ratios based on a predefined Frame Erasure Rate, in accordance with an embodiment of the present invention.

In summary, FIG. 8 is a high level flow diagram that describes an exemplary method that can be used to implement the estimator algorithm 12 or 212 illustrated by FIGS. 1 and 4. Essentially, steps 300 and 302 are initial steps that describe the computational burden that can be completed once and for all prior to implementing the estimator algorithm 12 or 212. For example, at step 300, a processor associated with an MS or BS computes probability functions for the measurement variables involved (e.g., RXLEV and RXQUAL as functions of the parameters $m_I$, $\sigma_I$, and g in the GSM). At step 302, a design engineer or operator selects filtering to be used in the estimator algorithm for each estimated parameter, in order to obtain smoothed estimates. At step 304, the estimator algorithm 12 or 212 then updates the likelihood function, by weighting together the information in a "new" measurement report with the current likelihood function (see Equation (7)). In this way, the "old" measurement reports can be "forgotten" exponentially. At step 306, the estimator algorithm 12 or 212 calculates the estimates, $\hat{m}_I$, $\hat{\sigma}_I$, and $\hat{g}$, and at step 308, the algorithm filters the estimates using different $\lambda$ factors for each estimated quantity, in order to obtain smoothed estimates that are adapted to how fast the different quantities are expected to change.

In accordance with a preferred embodiment of the present invention, the quality mapper 214 responds to a maximum allowable FER specified by a network operator. This specified value is then mapped onto an appropriate target C/I (given the estimated parameter $\hat{\sigma}_I$ input from estimator 212), which adapts the target C/I to the current traffic situation. The resulting target C/I is output to the power control algorithm 216.

Figure 9:
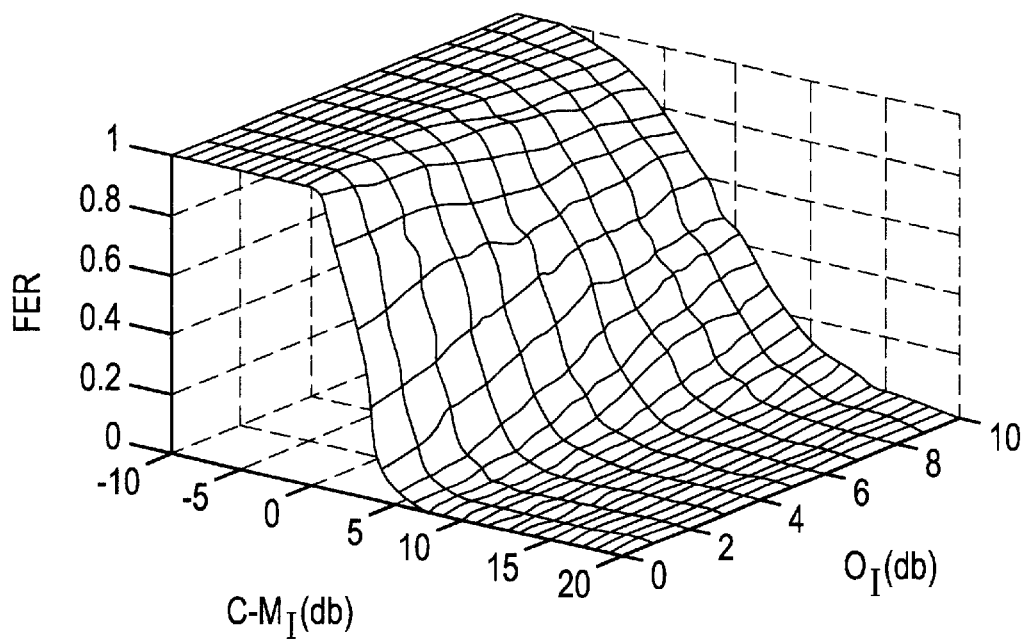
FIG. 9 is a diagram that illustrates a good approximation of a Frame Erasure Rate as a function of an estimated mean and standard deviation of an interference distribution and an estimated path loss, in accordance with an embodiment of the present invention.

As mentioned earlier, the FER is preferably described as a function of the estimated parameters. For this embodiment, the FER values are computed in a grid. For each gridpoint in the grid, a C/I sequence is generated, as described above. This sequence is then mapped onto the FER using, for example, the principles described by H. Olofsson in the above-described article. This procedure is then repeated several times to provide a good approximation of the FER as a function of the estimated parameters, as illustrated in FIG. 9.

For the quality mapper algorithm (e.g., software executed by a processor associated with an MS or BS) used in this embodiment, a specified maximum allowable FER is input by the operator. For example, an appropriate maximum allowable FER value for a frequency-hopping GSM is a value that is less than or equal to 0.02. Focusing on the threshold value of FER=0.02, this threshold value corresponds to a certain C/I value (C−$m_I$) given an estimated $\sigma_I$, as illustrated by the diagram shown in FIG. 10. As thus demonstrated, an appropriate target C/I can be determined by the quality mapper algorithm (214) from a specified FER level and an estimated standard deviation of the interference (estimated $\sigma_I$). Also, it can be concluded that the C/I together with the standard deviation of the interference ($\sigma_I$), describes the sound quality of the MS or BS receiver quite well.

In a normal traffic situation, a C/I equal to 10 dB is purported to correspond to an acceptable sound quality. For comparison purposes, such a normal traffic situation can be utilized for the quality mapper (214) described in the preferred embodiment. From simulations performed, the estimated standard deviation of the interference, $\hat{\sigma}_I$, is approximately equal to 6 dBm, which is also evidenced by the Monte Carlo simulations illustrated in FIGS. 5A–5C. As demonstrated by FIG. 10, this estimated $\sigma_I$ yields a target C/I of 10 dB, in order to achieve a FER value equal to 0.02. Also demonstrated is the fact that the preferred approach used herein for the quality mapper algorithm (214) covers the knowledge gained from prior experience. Therefore, in an operational situation, the MS or BS receiver involved is subjected to a varying $\sigma_I$ per sample, and the target C/I output from the quality mapper 214 will adapt to such variations accordingly.

More specifically, for the quality mapper algorithm (14 or 214), it is desirable to specify quality in terms of a chosen quality measure that satisfactorily describes quality perceived by the user. However, this measure is likely not suitable to be used as an input to the power control algorithm (16 or 216). Therefore, using estimated quantities, a solution is to map a specification in terms of the quality measure onto a quantity that is a more suitable input to the power control algorithm. When using the quality mapper algorithm (14 or 214) together with a power control algorithm, the target C/I is an example of such a suitable input.

Figure 11:
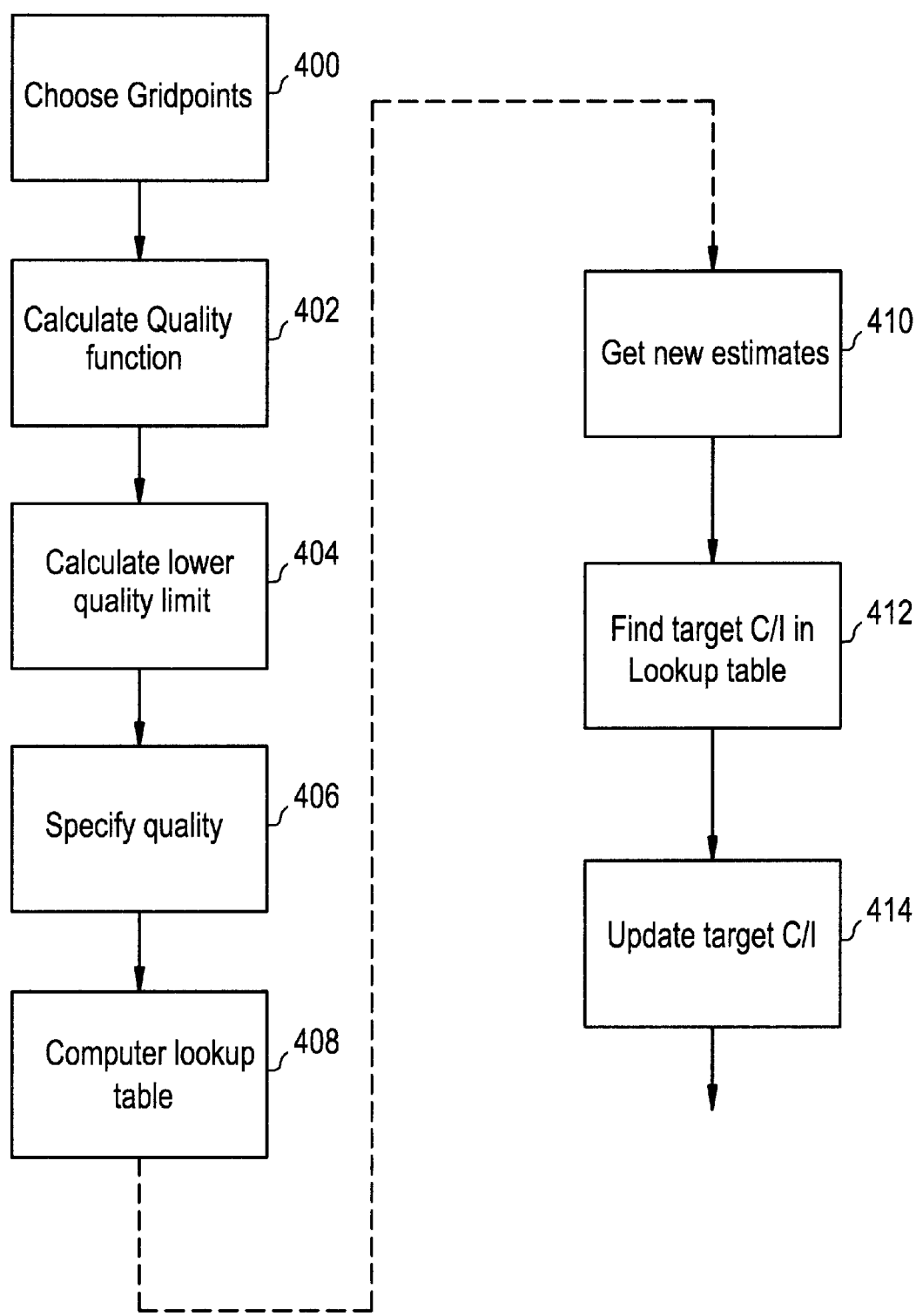
FIG. 11 is a high level flow diagram that describes an exemplary method that can be used to implement the quality mapper algorithms illustrated by FIGS. 1 and 4.

As such, FIG. 11 is a high level flow diagram that describes an exemplary method that can be used to implement the quality mapper algorithm 14 or 214 illustrated by FIGS. 1 and 4. Essentially, steps 400–408 are initial steps that describe the computational burden that can be completed once and for all prior to implementing the quality mapper algorithm 14 or 214. With FIG. 11 in mind, note that most of the computations involved in the quality mapper algorithm can be performed prior to the start-up of the system as described next. Assume that the quality measure values can be described using a "quality function": $Q(\gamma, \theta_1, \ldots, \theta_n)$, where $\gamma$ denotes the C/I, and $\theta_1, \ldots \theta_n$ denotes other (e.g., estimated) quantities, such as, for example, g, $m_i$, $\sigma_i$, etc. This quality function may be obtained, for example, from a model or from measurements. Also assume that "good" quality corresponds to a low value, and "bad" quality corresponds to a high value. However, the opposite can also hold true, and the following description can be updated accordingly. In general, it is extremely difficult, if not impossible, to describe this function analytically. Instead, a grid (finite set of points) can be chosen to cover the area of interest (step 400). Thereby, the $\gamma$ can only take on values in the specified set, $\gamma_1, \ldots \gamma_m$, which can be assumed to be sorted in ascending order. The grid is similar in the $\theta_i$-directions.

Next (step 402), the value of the quality function is computed in every point in the grid. If the number of $\theta$:s involved are few, the function may be plotted. For example, when the quality function is a FER, there is only one $\theta$-value, $\theta_1 = \sigma_1$, and the FER can be plotted as shown in FIG. 9.

The computed quality function can be used to determine if the chosen grid is sufficient. The maximum considered C/I ($\gamma_m$) has to correspond to a quality level that is less than the specified quality (step 404). More formally, let $\gamma = \gamma_m$ be fixed, and search over the rest of the grid for the maximum, $Q_0$, of the quality function:

$$Q_0 = max(Q(\gamma_m, \theta_1, \ldots, \theta_n)). \tag{9}$$

Figure 12:
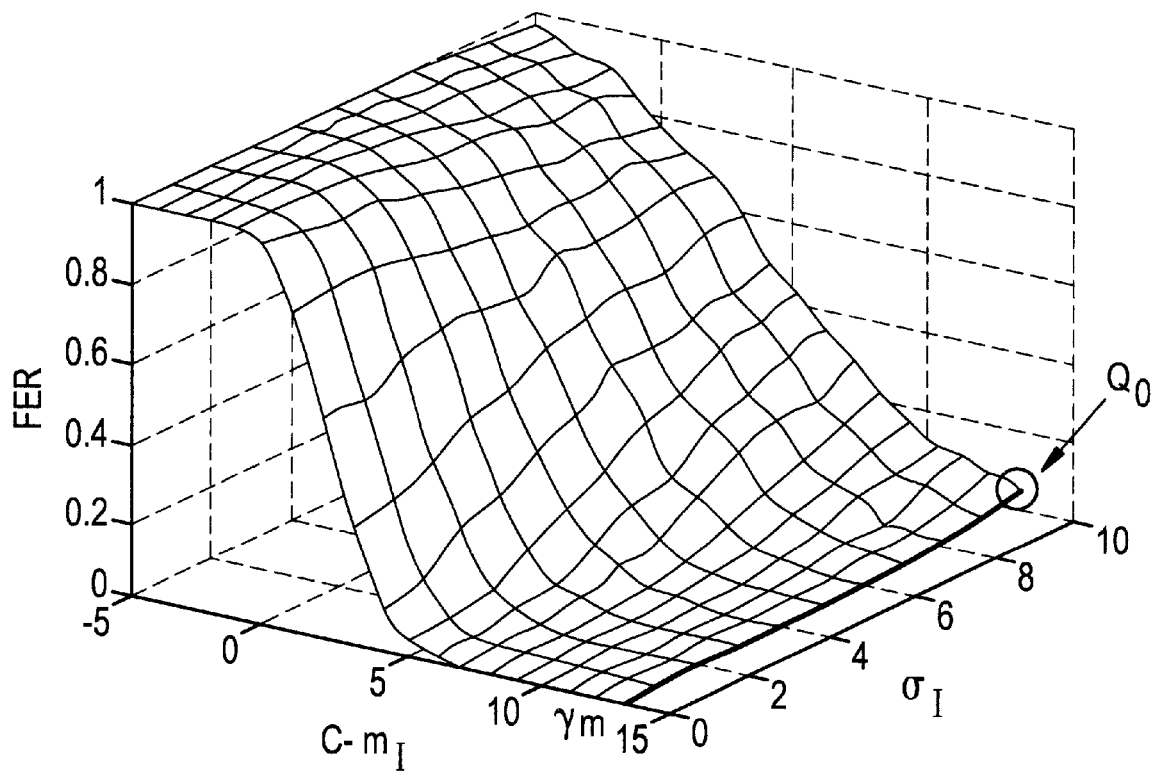
FIG. 12 is a diagram that illustrates that a FER plot can be used to determine a lowest quality value that can be specified.

This process is illustrated for the exemplary embodiment as shown in FIG. 12. FIG. 12 illustrates that a FER plot can be used to determine the lowest quality value that can be specified, by conducting a search along $\gamma = \gamma_m$ in the grid. If the specified quality, $Q_{spec}$, is below $Q_0$, the grid is expanded to include higher values of $\gamma$.

Next, for this exemplary embodiment, the quality function is used to create a look-up table for $\gamma_{tgt}$ (step 408). For all of the $\theta$:s in the grid, the following is computed:

$$\overline{Q}(\gamma_i) = Q(\gamma_i, \theta_1, \ldots, \theta_n), \tag{10}$$

for $I = 1, \ldots, m$. The table entry for each point in the grid is then computed as:

$$j = \min_i (i | \overline{Q}(\gamma_i), \overline{Q}(\gamma_{i+1}), \ldots, \overline{Q}(\gamma_m) \leq Q_{spec}), \tag{11}$$

$$\gamma_{tgt}(\theta_1, \ldots, \theta_n) = \gamma_j + \gamma_{bias}. \tag{12}$$

Figure 13:
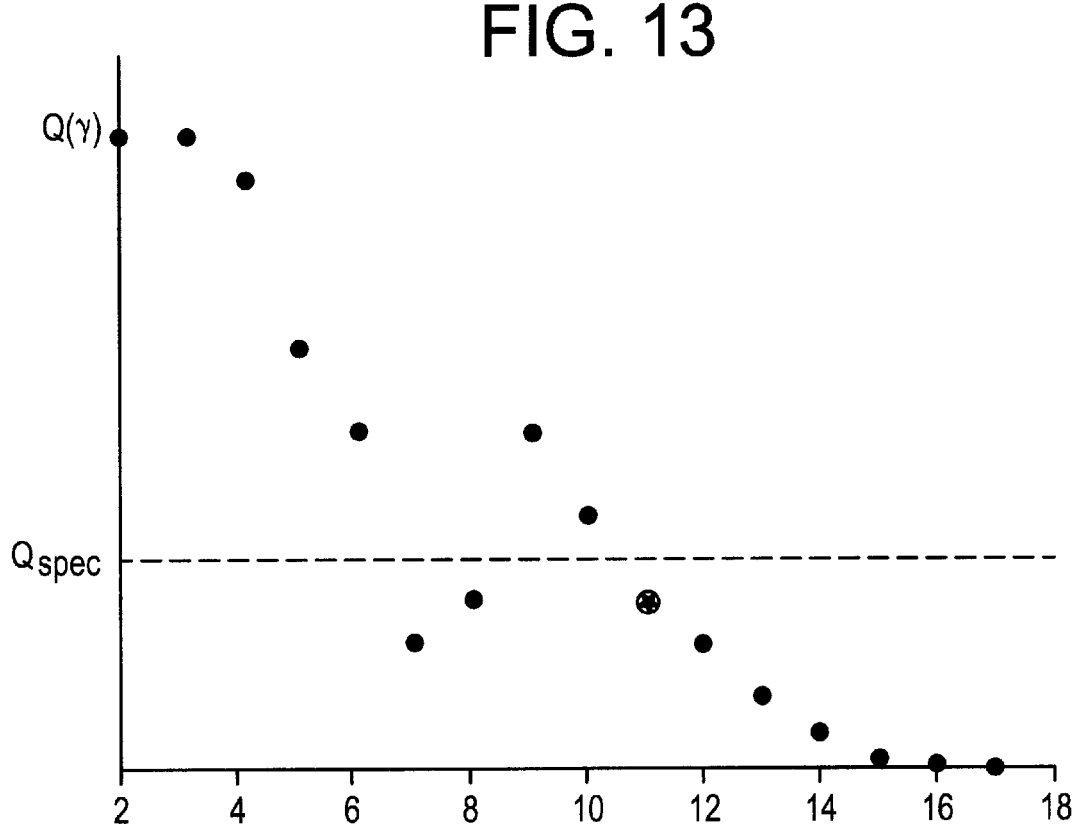
FIG. 13 is a diagram that illustrates which target carrier-to-interference ratio to choose given estimated values.

This construction might seem complicated, but for some quality functions, $\overline{Q}(\gamma)$ can appear as in FIG. 13 given $\theta_1, \ldots, \theta_n$. FIG. 13 illustrates that the quality function may vary around the specified value in the general case. Consequently, the first value after the last intersection in FIG. 13 should be selected. It is important not to choose too small a value. To ensure adequate quality, it can be preferable to assign a target C/I that is slightly higher than the value given by an exact mapping. In such a case, $\gamma_{bias}$ is assigned a positive value, otherwise it can be zero.

For this exemplary embodiment, the result of the above-described method can be, for example, a look-up table that relates the $\theta$:s with a $\gamma_{tgt}$. The look-up table can be maintained in a database associated with the MS or BS involved in implementing the quality mapper algorithm (14 or 214). During execution of the quality mapper algorithm, the quality mapping can be performed by using the look-up table. Most likely, the estimated $\theta$:s will not fit the grid perfectly. However, interpolation can be used to make a better fit.

Upon execution, at step 410, the quality mapper algorithm (14 or 214) obtains the new estimates, $\hat{g}$, $\hat{m}_i$, $\hat{\sigma}_i$, etc., from the output of the estimator algorithm (12 or 212). At step 412, the algorithm finds the target C/I from the look-up table. At step 414, the quality mapper algorithm updates the target C/I from the look-up table with the new estimates' information, and provides the updated target C/I as an output for use by the power control algorithm (16 or 216).

Figure 14:
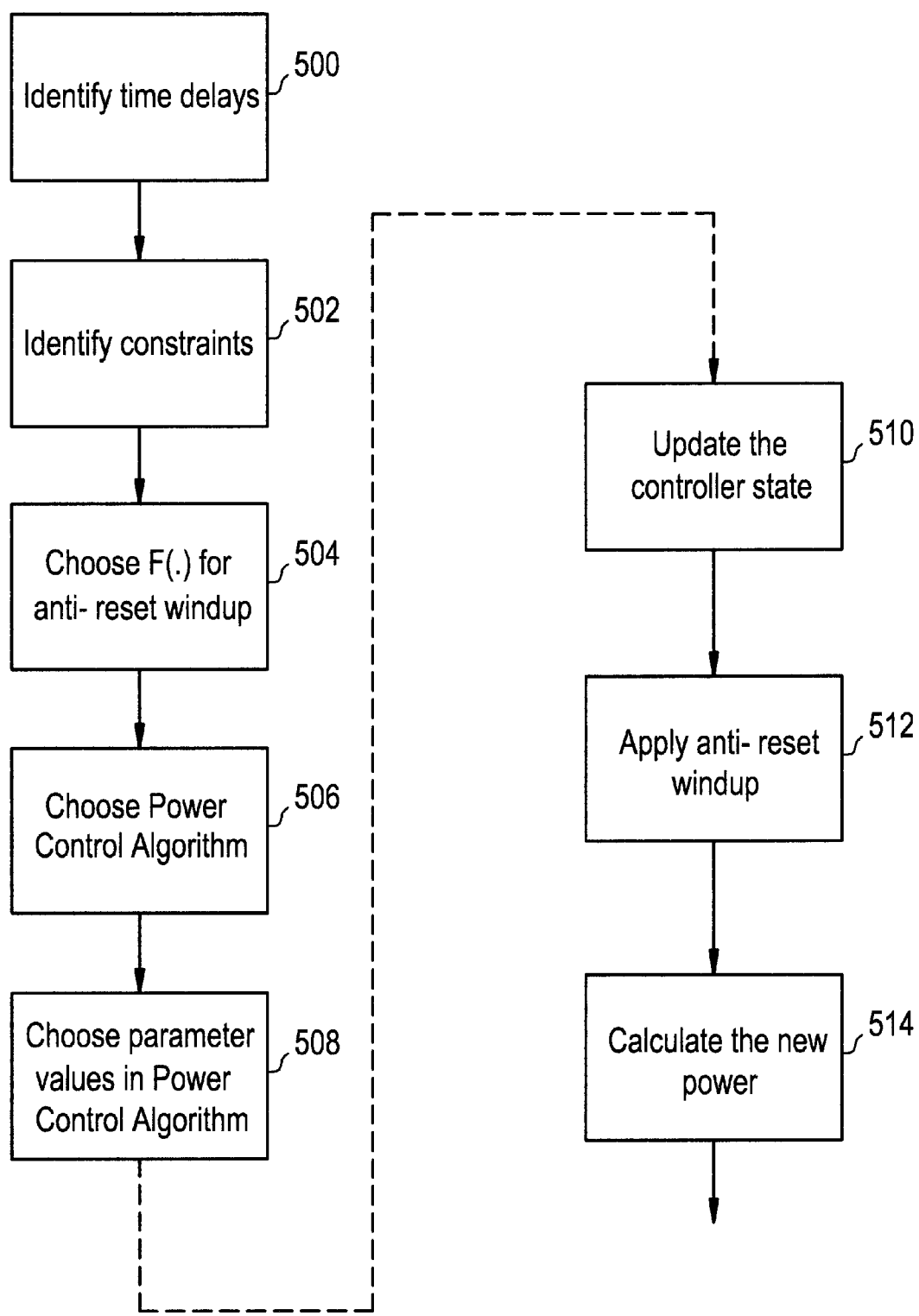
FIG. 14 is a high level flow diagram that describes an exemplary method that can be used to implement the power control algorithms illustrated by FIGS. 1 and 4.

As described above, a primary function of the power control algorithm (16 or 216) is to assign an appropriate transmission power level so that the measured C/I (from the "environment") will accurately track the target C/I (input from the quality mapper 14 or 214). The present invention provides two methods to perform that function. As such, FIG. 14 is a high level flow diagram that describes an exemplary method that can be used to implement the power control algorithm 16 or 216 illustrated by FIGS. 1 and 4. Essentially, steps 500–508 are initial steps that describe the computational burden that can be completed once and for all prior to implementing the power control algorithm 16 or 216.

For simplicity, values in logarithmic scale (dB and dBw) will be used in all of the present algorithms. As described above, the conventional power control approaches offer no real solutions to the problems related to hardware constraints (e.g., output power limits and quantization). Additionally, external constraints may be imposed that demand a certain power level. For example, the use of a Broadcast Control Channel (BCCH) in the GSM requires the use of maximum transmission power. If all of these constraints are summarized in the function f(·), and the computed output power is denoted by p, the true output at the transmitter will be f(p). Also, the effects of time delays can be crucial for power control, and they should be identified in order to be able to select appropriate counteractive parameters. In most standards, the power regulator communicates with the transmitter/receiver only at pre-defined instants separated by the sample interval, $T_s$.

In accordance with one embodiment of the present invention, a PID controller can be used for the power control algorithm 216. The PID controller (216) comprises a proportional component (P), an integrating component (I), and a differentiating component (D). In general, the PID controller algorithm can be described by the following expressions:

$$e(t) = \gamma_{tgt}(t) - \gamma(t), \qquad (13)$$

$$I(t+1) = I(t) + K_i T_s e(t), \qquad (14)$$

$$p(t+1) = K_p e(t) + I(t+1) + K_d e(t) - \frac{e(t-1)}{T_s}, \qquad (15)$$

where C/I is denoted by $\gamma$, target C/I by $\gamma_{tgt}$, $T_s$ is the sampling interval (typically 0.5s in the GSM), I(t) is the integrator state, e(t) is the error between the target C/I and the measured C/I, and $K_p$, $K_i$ and $K_d$ are PID controller parameters.

In order to counteract the effects of the hardware constraints, they first have to be identified (steps 500 and 502). Recall that f(p) summarizes the total effect of the hardware and external constraints. Then "anti-reset windup" can be applied (step 504), by updating the integrator state again after computing the power level, which can be expressed as follows:

$$I(t+1) := I(t+1) + \frac{T_s}{T_t}(f(p(t+1)) - p(t+1)). \qquad (16)$$

If $T_t = T_s$, the integrator state will correspond to the actual output, which is generally desirable.

When the measurements are noisy, the differentiating part of the PID controller algorithm (216) may over-react. A solution to this problem is either to omit the differentiation (D) component or apply an approximate differentiation. The latter effect can be achieved by the use of a low pass filter. However, since the target C/I, $\gamma_{tgt}$ is subject to abrupt changes, this approximate differentiation can be applied only to the estimated C/I, $\gamma(t)$.

The effects of the time delays in the "environment" affect the choice of parameters. Consequently, when time delays are present, it is preferable to omit the proportional component (P) from the PID controller algorithm (216). If the P and D components of the PID controller algorithm are omitted, the power output Equation (15) can be rewritten as follows:

$$p(t+1) = I(t+1). \qquad (17)$$

If there are no constraints involved (i.e., f(p)=p), and if $\beta = K_i T_s$ is introduced, Equations (13), (14), (17) yield:

$$p(t+1) = p(t) + \beta(\gamma_{tgt}(t) - \gamma(t)). \qquad (18)$$

In U.S. Pat. No. 5,574,982 to Almgren et al., the following algorithm is disclosed:

$$p(t+1) = \alpha - \beta(\gamma(t) - p(t)). \qquad (19)$$

This expression can be rewritten as:

$$p(t+1) = \beta p(t) + \beta(\gamma_{tgt} - \gamma(t)), \qquad (20)$$

where $\gamma_{tgt} = \alpha/\beta$. The similarity of Equation (20) with Equation (18) can be recognized. The algorithm represented by Equation (20) is somewhat more conservative than the above-described PID control algorithm. Notably, it is beneficial to apply anti-reset windup to this algorithm as well, by substituting for Equation (20) by:

$$I(t+1) = \beta I(t) + \beta(\gamma_{tgt} - \gamma(t)), \qquad (21)$$

$$I(t+1) := I(t+1) + \frac{T_s}{T_t}(f(I(t+1)) - I(t+1)), \qquad (22)$$

$$p(t+1) = I(t+1). \qquad (23)$$

In order to fit this algorithm in with the present inventive concept, a time-varying $\gamma_{tgt}(t)$ is allowed.

There are primarily two types of time delays in the network. First, it takes some time to perform measurements and report the measurements to the power regulator (10, 200), which results in a delay of $n_m$ sample intervals. Second, there is a time delay of $n_p$ sample intervals due to the time it takes before the computed power is actually used in the transmitter. In this regard, although it should be understood that the present inventive methods described herein cover the general case, the following example is provided to clarify the choice of parameters in the power control algorithm shown above in Equation (18). As such, this algorithm tracks to the target C/I, $\gamma_{tgt}$, given that it is achievable. Accordingly, the "delay operator" is defined in the time domain as:

$$q^{-1}p(t) = p(t-1), \qquad (24)$$

$$qp(t) = p(t+1). \qquad (25)$$

Applying the above to Equation (18) yields:

$$qp(t) = p(t) + \beta(\gamma_{tgt}(t) - \gamma(t)), \qquad (26)$$

$$p(t) = \frac{\beta}{q-1}(\gamma_{tgt}(t) - \gamma(t)). \qquad (27)$$

Figure 15:
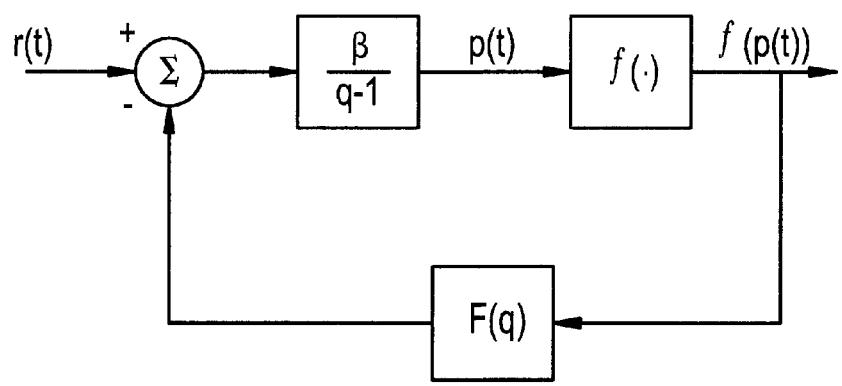
FIG. 15 is a simplified block diagram that illustrates a local loop of a power control algorithm.

The C/I is not available directly, and we can assume that the effects of using an estimator (12, 212) are described by the transfer function (filter), F(q). Furthermore, the gain from transmitter to receiver is denoted by g(t). The interference at the receiver is denoted by I(t). As such, the C/I (in dB) at the receiver is given by f(p(t))+g(t)−I(t). If it is assumed that g(t) and I(t) are varying slowly, the time delays can be treated together, and the total time delay, n=$n_p$+$n_m$, can be defined. Also, it can be assumed that the filter, F(q), will have no appreciable effect on g(t) and I(t), since they are varying slowly. Consequently, the local loop of this power control algorithm can be depicted as shown in FIG. 15. Note that the effects from other transmitters are summarized in the interference, I(t).

For the first case, assume that there are no physical constraints present, that is f(p)=p, and that perfect estimates can be obtained (i.e., F(q)=1). The closed loop system, which relates the output, f(p(t)), to the input, r(t), is given by the expression:

$$G_{cl}(q) = \frac{\beta}{q-1+\beta q^{-n}} = \frac{\beta q^n}{q^{n+1}-q^n+\beta}. \quad (28)$$

In order to analyze stability, it is of interest to observe how the closed loop poles (i.e., the roots of the denominator polynomial) are varying with $\beta$. More specifically, the interest lies in the $\beta$:s yielding exponential stability (i.e., when all the poles are inside the unit circle). The locations of the closed loop poles (when n=1) as functions of the parameter, $\beta$, are plotted in the root locus plot shown in FIG. 16, where the "x":s correspond to $\beta$=0.

Figures 16, 17:
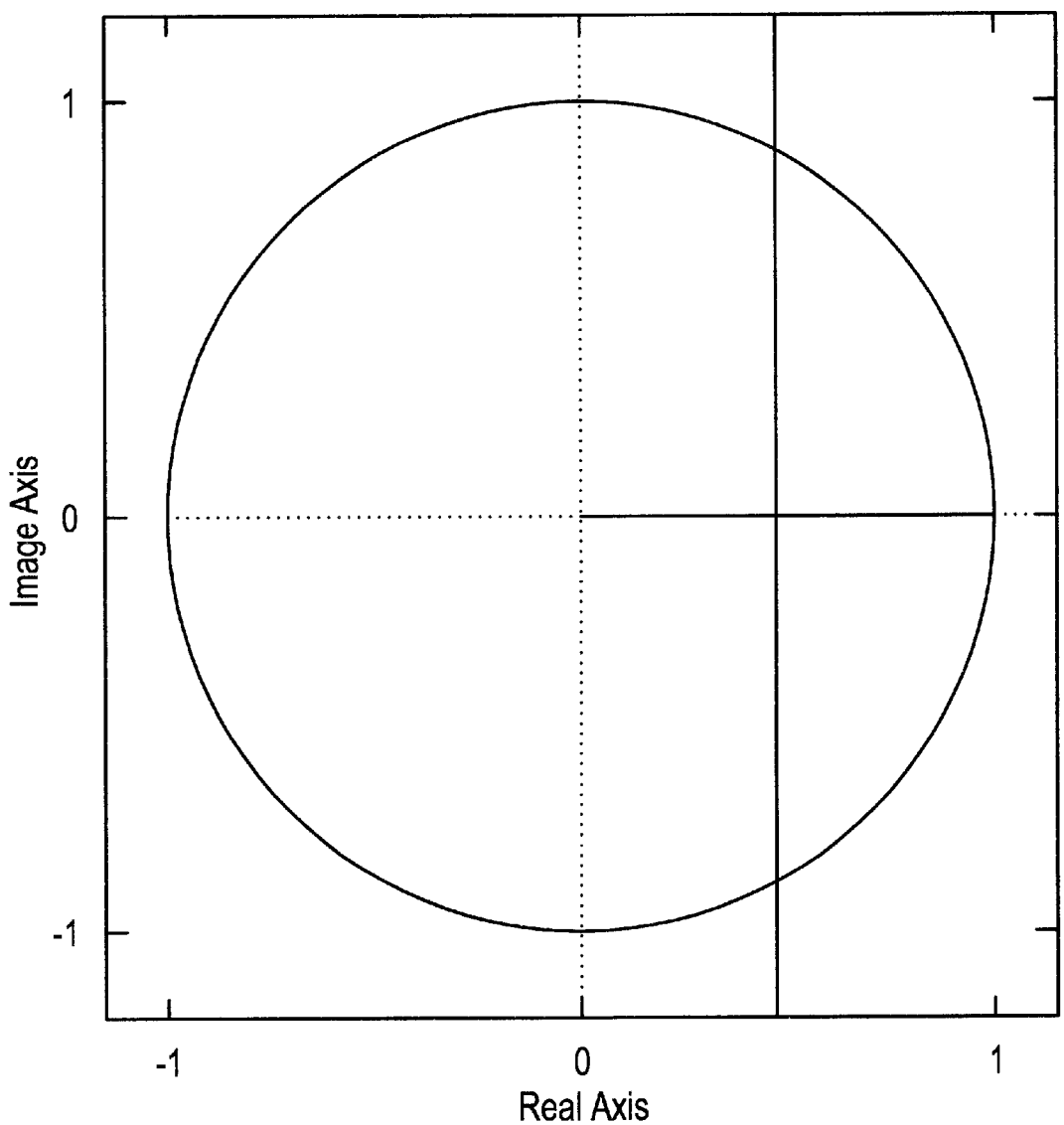
FIG. 16 is a diagram that illustrates the locations of the closed loop poles for a specific situation.
FIG. 17 is a Table that illustrates the local loop stability region given by upper bounds on a controller parameter $\beta$.

In order to observe the effects of time delays, the stability constraints on $\beta$ for certain cases are listed in the Table shown in FIG. 17 (which illustrates the local loop stability region given by upper bounds on $\beta$). As shown, the results yield instability limits for $\beta$, and thus, larger $\beta$ values will result in an unstable system. When there are several active communication links, they will interfere with each other. Consequently, the overall system can become unstable at a lower $\beta$ than illustrated for this analysis. More generally, it can be said that local instability will result in global instability, but local stability will not guarantee global stability. However, there are indications that in most cases the global stability limit is close to the local stability limit, even though this has not been proven in general.

Figure 18:
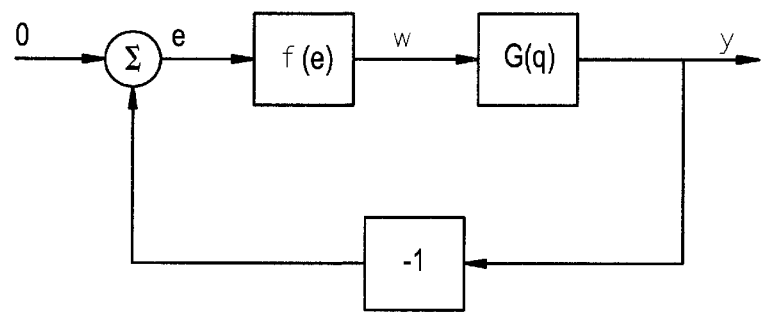
FIG. 18 is a simplified block diagram that illustrates a non-linear system separated into a linear part and a non-linear part.
Figure 19A:
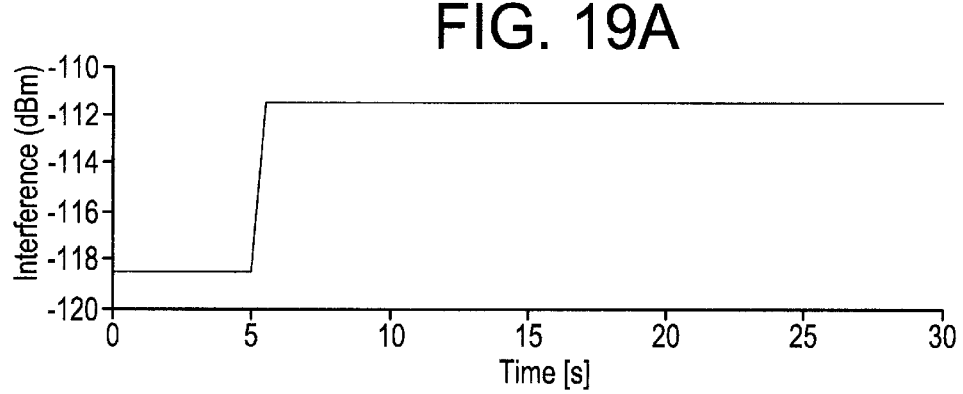
FIGS. 19A–19C are related diagrams that illustrate simulation situations, which can be used when studying the effects of applying anti-reset windup in a power control algorithm, in accordance with an embodiment of the present invention.
Figure 19B:
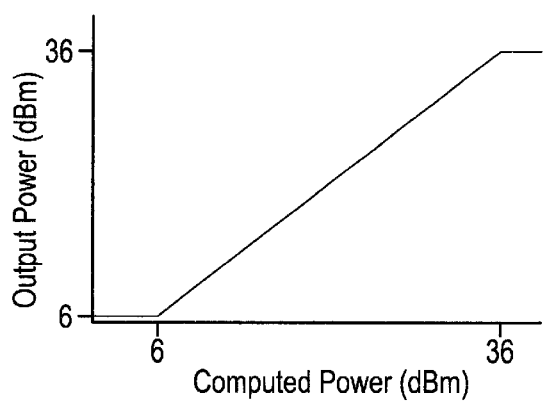
Figure 19C:
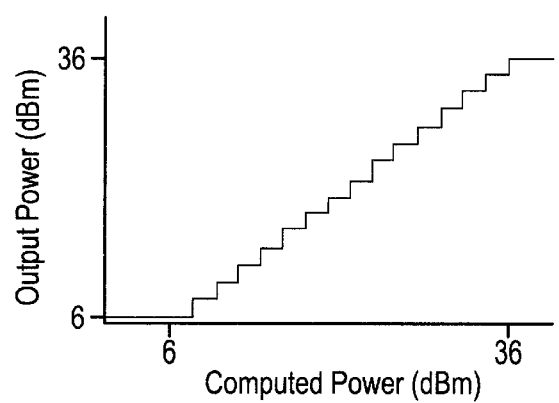

Using describing functions in discrete time, problems can be analyzed that are characterized by the block diagram shown in FIG. 18. The system is composed of a linear part with a transfer function, G(q), and a static non-linearity given by the function, f(·), which is assumed to be odd (only for this simple example, but the results can be readily extended to the case of an arbitrary static function).

The first step is to make the N-periodic ansatz of the error, e(t)=C sin ($\Omega$t), where $\Omega$=2$\pi$/N. Since the function f(·) is a static non-linearity, the signal $\omega$(t) is N-periodic as well. Using time-discrete Fourier series expansion, the signal $\omega$(t) can be decomposed into its Fourier components:

$$\omega(t)=f(C\sin(\Omega t))=A(C,\Omega)\sin(\Omega t+\phi(C,\Omega))+A_2(C,\Omega)\sin(2\Omega t+\phi_2(C,\Omega))+ \quad (29)$$

Furthermore, it can be assumed that the linear system, G(q), will attenuate the harmonics much more than the fundamental frequency. This is the only approximation made in this analysis. Since e(t)=−y(t) according to FIG. 18, a conclusion is that the condition for oscillations is that the "loop gain" is equal to −1. The loop gain is composed of an amplitude gain and a phase shift, which in turn are functions of the period, N, and the amplitude, C. Graphically, the loop gain can be plotted in the complex plane for different Ns and Cs, and the solution, C=$C_0$, N=$N_0$ found that yields an intersection with −1. The solution can also be found analytically in some cases. This method is referred to as "describing function analysis".

Figures 20A, 20B:
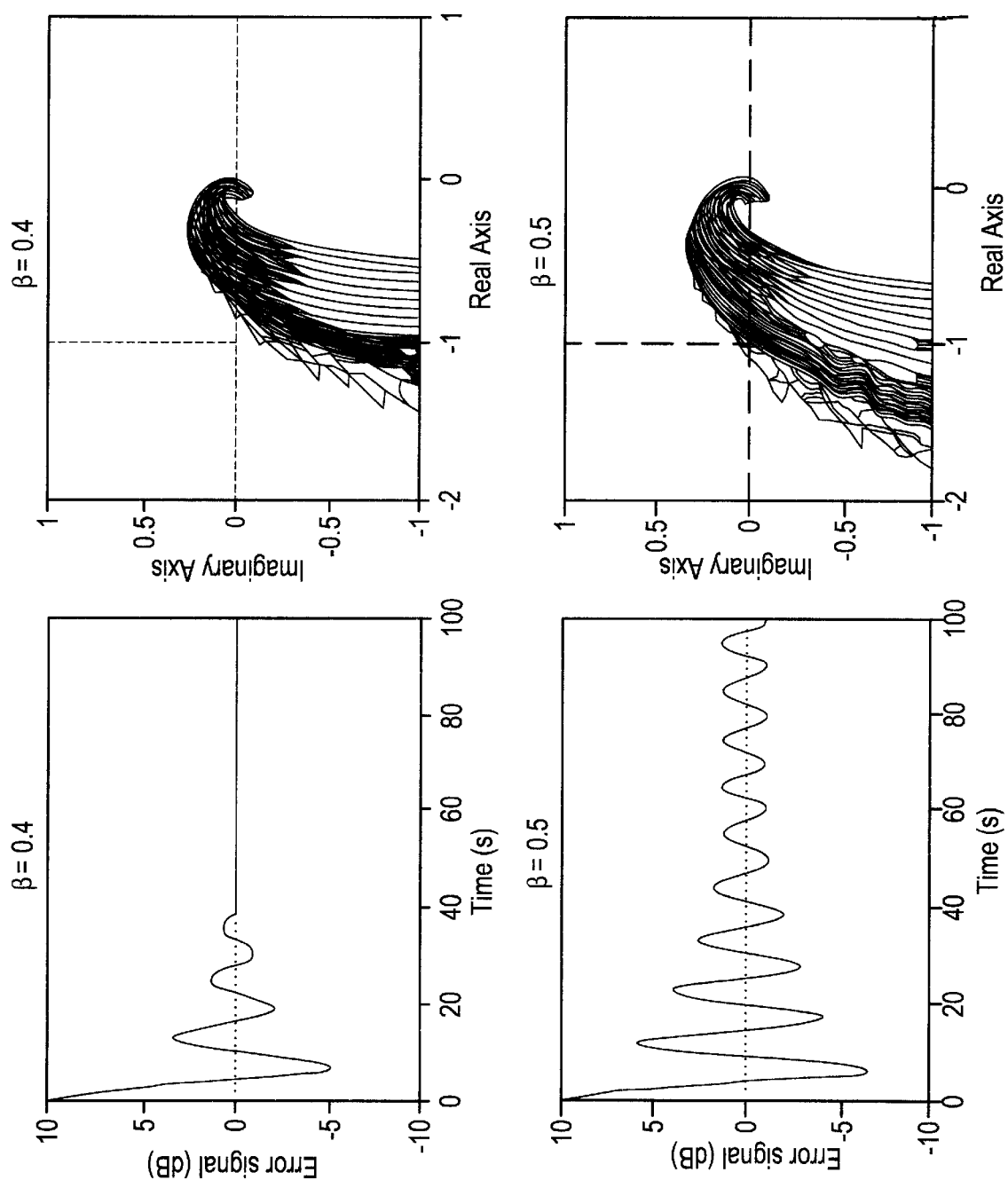
FIGS. 20A–20B are related diagrams that illustrate the effects of quantization and saturation on an error signal.

The above-described techniques can be applied in the case of the power control algorithm in local loop as illustrated in FIG. 15. First, the physical constraints have to be identified (step 502), and here it can be assumed that they can be described by FIG. 19C below. As such, consider the case where n=2. The loop gains can be plotted for different $\beta$:s, and it can be determined if it is possible to solve for C=$C_0$ and N=$N_0$. As such, FIGS. 20A and 20B are related diagrams that show the effects of quantization and saturation on the error signal, e(t), together with the set of possible $N_0$ and C constellations. FIGS. 20A and 20B demonstrate that it is possible to solve for C=$C_0$ and N=$N_0$ when $\beta$=0.5, but not when $\beta$=0.4. Hence, oscillations are predicted when $\beta$=0.5, but not when $\beta$=0.4, which is correct according to the simulations shown in the left column of FIGS. 20A and 20B. It can be observed that there is a fundamental difference between the asymptotic behaviors of the systems, whereby the system with the smaller $\beta$ converges to a fixed value, while the other system does not (even though both systems are well below the stability limits for the system with the non-linearities removed, such as seen in the Table of FIG. 17).

The above-described method can also be used to search for the smallest $\beta$ that will given an oscillation, based on the criterion that there will be an oscillation if the point, −1, in the plot is covered. Such a search has been completed for the same systems analyzed above. The results of that search are summarized in the Table shown in FIG. 21, which illustrates the limits of $\beta$ that result in oscillations. The Table in FIG. 21 can be compared with the Table shown in FIG. 17. Notably, it should be remembered that local stability does not imply global stability. However, the above-described limits can be used as "rules of thumb". A preferable strategy is to choose a value for $\beta$ that is not too close to the limits.

Figure 22B:
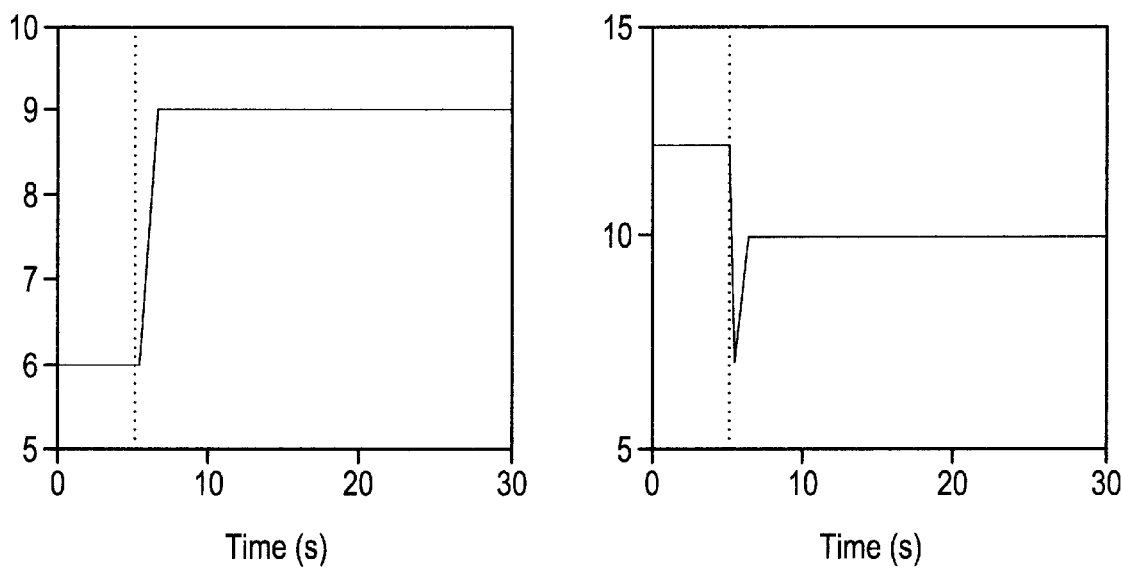
Figure 22B:
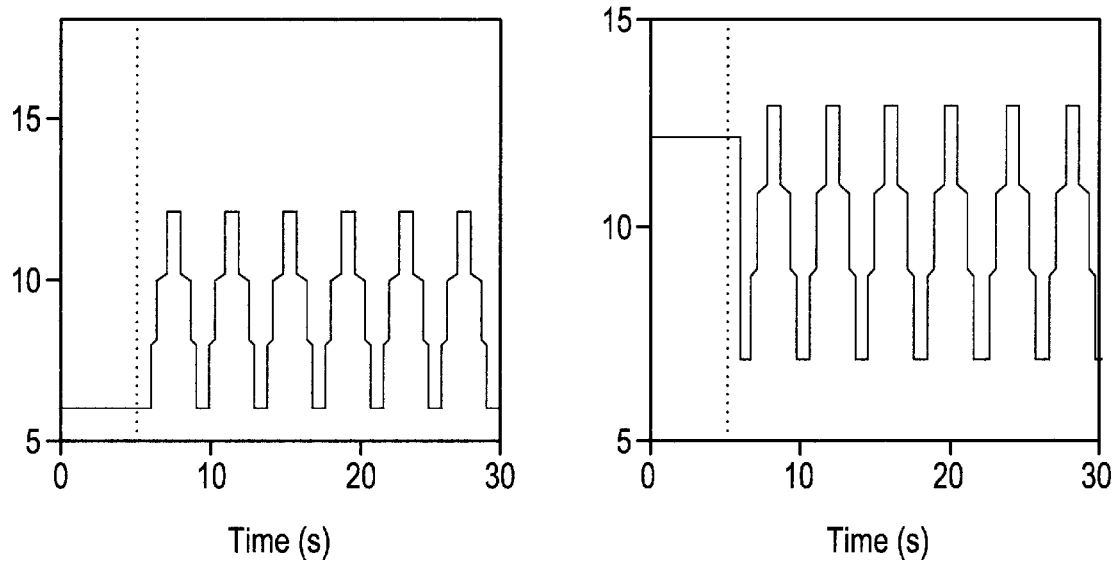
Figure 22C:
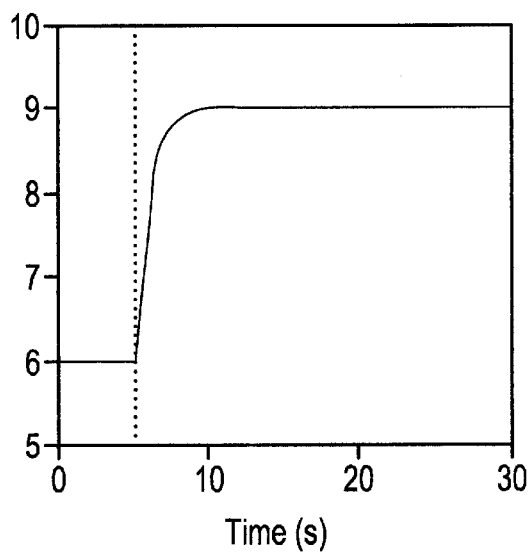
Figure 22C:
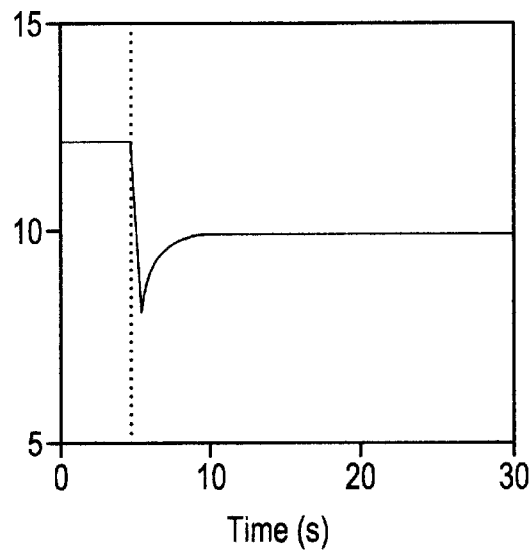
Figure 22C:
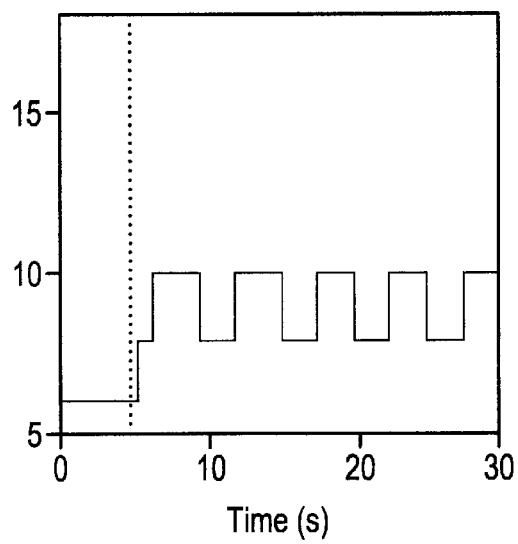
Figure 22C:
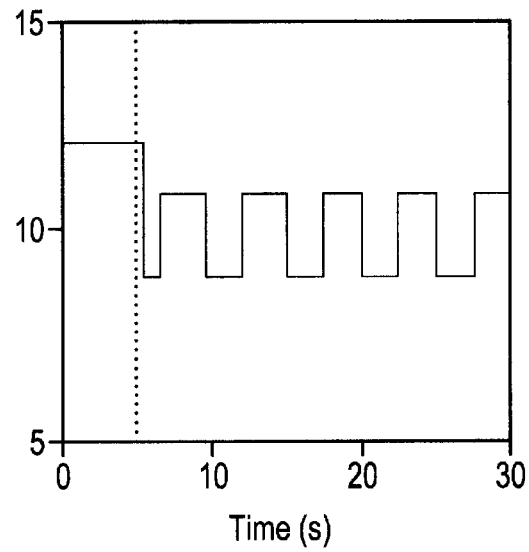

In order to better illustrate the effects and benefits of anti-reset windup (step 512) and an appropriate choice of parameter values (step 508), two relatively simple situations may be considered. First, consider a settled system where the power control algorithms associated with the MSs and BSs have converged, and those algorithms are striving to achieve a possible C/I of 10 dB. For simplicity, the focus of this example is on a specific (user) connection using a single channel. At the instant of time, t=5s, the interference as experienced by that specific user increases as illustrated by FIG. 22A (e.g., by about 6 dB). Additionally, the output power is subject to hardware constraints. As such, two situations can be considered, as illustrated by FIGS. 22B and 22C. For the first situation (FIG. 22B), there are no time delays present in the "environment" 218 ($n_m$=0 and $n_p$=0). As shown in FIG. 22B, the output power thus has an upper and lower limit. For the second situation (FIG. 22C), there are time delays present ($n_m$=1 and $n_p$=1). As shown in FIG. 22C, the output power is thus quantized in 2 dB steps, and also has an upper and lower limit.

The recovery abilities of the different power control algorithms described above, when subjected to a step increase in the interference, are illustrated in FIGS. 22A–22C. FIG. 22A illustrates the recovery ability of the MDBA, FIG. 22B for the power control algorithm disclosed in the above-described article by M. Almgren, K. Andersson and K. Wallstedt, and FIG. 22C for the preferred PID power controller with anti-reset windup. The results in the two situations (no time delays versus time delays) are shown. The first and third columns from the left illustrate the output power levels for the three power control algorithms in the two situations, while the second and fourth columns from the left illustrate the resulting C/I.

As shown in FIGS. 22A–22C, initially when the algorithms are settled, they use the minimum power that is sufficient to achieve a C/I which is higher than the target C/I of 10 dB. These diagrams show that the constraints in the first situation slow down the recovery of the MDBA. In the second situation, the MDBA and the M. Almgren et al. algorithm are operating close to instability, while the PID power control algorithm with anti-reset windup recovers very well despite the time delays and constraints involved.

Finally, at step 510, the power control algorithm (16 or 216) updates the power controller states with the chosen parameter values (from step 508). At step 512, anti-reset windup is applied, and at step 514, the new power value, p, to be output by the power control algorithm (16 or 216) is calculated.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for performing quality-based power control in a mobile communications system, comprising the steps of:

estimating an interference distribution and a path loss from system measurement information;

computing both a carrier and a carrier-to-interference ratio from said estimated interference distribution and from said estimated path loss;

determining a target carrier-to-interference ratio based on each of a predefined quality goal that is desired for the system, said computed carrier, said estimated interference distribution, and said estimated path loss, said predefined quality goal comprising a quality goal other than a carrier-to-interference ratio; and assigning transmitter power levels such that said computed carrier-to-interference ratio substantially tracks said target carrier-to-interference ratio.

2. The method of claim 1, wherein said system measurement information comprises RSSI and QI information.

3. The method of claim 1, wherein said estimating step comprises estimating a mean and a standard deviation for said interference distribution, and wherein said determining step comprises mapping said estimated standard deviation and said predefined quality goal onto said target carrier-to-interference ratio.

4. The method of claim 3, wherein the mobile communications system comprises a GSM.

5. The method of claim 3, wherein the mobile communications system comprises a random frequency-hopping system.

6. The method of claim 1, wherein the estimating step is performed with a maximum likelihood estimator.

7. The method of claim 1, wherein said predefined quality goal comprises a Frame Erasure Rate.

8. The method of claim 1, wherein the assigning step further comprises the step of applying anti-reset windup to reduce effects of physical constraints.

9. A method for estimating a carrier-to-interference ratio for quality-based power control in a mobile communications system, comprising the steps of:

inputting a sequence of measurement reports indicative of signal measurements that have been made in the system;

updating a likelihood function with measurement report information from at least one measurement report of said sequence of measurement reports;

computing a plurality of values for an estimated mean value of an interference, an estimated standard deviation value of said interference, and an estimated path loss, said interference and said path loss derived from the updating step; and deriving the estimated carrier-to-signal interference ratio using a transmission power value, said estimated mean value of said interference, and said estimated path loss.

10. The method of claim 9, further comprising the step of smoothing said plurality of values.

11. A method for computing a target carrier-to-interference ratio for controlling transmission power in a mobile communications system, comprising the steps of:

inputting a plurality of values for an estimated mean value of an interference, an estimated standard deviation value of said interference, and an estimated path loss; and determining a target carrier-to-interference ratio based on a predefined quality goal that is desired for the system, and said plurality of values.

12. The method of claim 11, wherein the determining step is performed using a look-up table.

13. The method of claim 11, wherein the transmission power is controlled by:

computing a carrier-to-interference ratio from said plurality of values; and assigning transmitter power levels such that said computed carrier-to-interference ratio tracks substantially with said target carrier-to-interference ratio.

14. The method of claim 13, wherein the transmission power is controlled by a PID controller.

15. The method of claim 13, wherein the transmission power is controlled by an MDBA.

16. The method of claim 13, further comprising the step of applying anti-reset windup to said transmitter power levels.

17. A method for performing quality-based power control in a mobile communications system, comprising the steps of:

inputting at least one interference distribution characteristic and a signal gain characteristic; and determining a target carrier-to-interference ratio based on a predefined quality goal that is desired for the system, said at least one interference distribution characteristic and said signal gain characteristic.

18. The method of claim 17, further comprising the steps of:

inputting a transmission power value; and mapping said transmission power value, said predefined quality goal, said at least one interference distribution characteristic and said signal gain characteristic onto said target carrier-to-interference ratio.

19. A method for performing quality-based power control in a mobile communications network, comprising the steps of:

inputting network quality information indicative of a quality condition existing in the network;

inputting a predefined quality goal that is desired for the network;

estimating a path loss from system measurement information; and outputting a target carrier-to-interference ratio based on said network quality information, said estimated path loss, and said predefined quality goal.

20. A method for performing quality-based power control in a mobile communications system, comprising the steps of:

identifying at least one time delay;

determining if there are physical constraints involved in performing the quality-based power control;

if there are physical constraints involved in performing the quality-based power control, utilize at least one describing function to predict limits for oscillations in a local loop; and if there are no physical constraints involved in performing the quality-based power control, determine locations of local loop poles that keep a power controller operating within a stability region.

21. The method of claim 20, wherein said at least one time delay is equal to zero.

22. The method of claim 20, wherein said at least one describing function comprises at least one discrete time describing function.

23. The method of claim 20, wherein it is determined that a set of controller parameters imply that said power controller is stable.

24. The method of claim 20, wherein said limits comprise limits on power controller parameters.

25. A system for performing quality-based power control in a mobile communications system, comprising:

at least one base station system;

a plurality of mobile stations; and a power regulator associated with said at least one base station system and said plurality of mobile stations, said power regulator operable to:

estimate an interference distribution and a path loss from network measurement information;

compute both a carrier and a carrier-to-interference ratio from said estimated interference distribution and said estimated path loss;

determine a target carrier-to-interference ratio based on each of a predefined quality goal that is desired for the system, said computed carrier, said estimated interference distribution, and said estimated path loss, said predefined quality goal comprising a quality goal other than a carrier-to-interference ratio; and assign transmitter power levels such that said computed carrier-to-interference ratio substantially tracks said target carrier-to-interference ratio.

26. The system of claim 25, wherein the mobile communications system comprises a GSM.

27. The system of claim 25, wherein the mobile communications system comprises a random frequency-hopping system.

28. The system of claim 25, wherein said power controller is operable to estimate with a maximum likelihood estimator.

29. The system of claim 25, wherein said predefined quality goal comprises a Frame Erasure Rate.

30. The system of claim 25, wherein said power controller is further operable to assign transmitter power levels by applying anti-reset windup to reduce effects of physical constraints.

31. A system for performing quality-based power control in a mobile communications system, comprising:

at least one base station system;

a plurality of mobile stations; and a power regulator associated with said at least one base station system and said plurality of mobile stations, said power regulator operable to:

compute a carrier-to-interference ratio from measurement information;

estimate a path loss from system measurement information;

determine a target carrier-to-interference ratio based on a predefined quality goal that is desired for the system, said estimated path loss, and said computed carrier-to-interference ratio, said predefined quality goal comprising a quality goal other than a carrier-to-interference ratio; and assign transmitter power levels such that said computed carrier-to-interference ratio substantially tracks said target carrier-to-interference ratio.

32. The method of claim 11, wherein the quality goal is a quality condition other than a carrier-to-interference ratio.

33. The method of claim 17, wherein the quality goal is a quality condition other than a carrier-to-interference ratio.

34. The method of claim 19, wherein the quality goal is a quality condition other than a carrier-to-interference ratio.

* * * * *

UNITED STATES PATENT AND TRADEMARK OFFICE
CERTIFICATE OF CORRECTION

PATENT NO. : 6,449,462 B1
DATED : September 10, 2002
INVENTOR(S) : Gunnarsson et al.

It is certified that error appears in the above-identified patent and that said Letters Patent is hereby corrected as shown below:

Column 6,
Line 20, replace "is mapped tag onto a" with -- is mapped onto a --

Column 8,
Line 55, replace "$logl_t(\theta) = logf_x(x_t;\theta) + \lambda logl_{-1}(\theta)$" with
-- $logl_t(\theta) = logf_x(x_t;\theta) + \lambda logl_{t-1}(\theta)$ --

Column 9,
Line 15, replace "$m^b$" with -- $m_I$ --.
Line 47, replace "RWQUAL)" with -- RXQUAL) --

Column 15,
Line 54, replace "Since e (t) =-$\gamma$ (t)" with -- Since e (t) =-y (t) --

Signed and Sealed this

Fourth Day of February, 2003

JAMES E. ROGAN
*Director of the United States Patent and Trademark Office*